US010924768B2

(12) United States Patent
Shibuya

(10) Patent No.: US 10,924,768 B2
(45) Date of Patent: Feb. 16, 2021

(54) IMAGE DISPLAY TERMINAL, IMAGE TRANSMISSION TERMINAL, IMAGE DISPLAY SYSTEM, IMAGE DISPLAY METHOD, AND RECORDING MEDIUM

(71) Applicant: OLYMPUS CORPORATION, Hachioji (JP)

(72) Inventor: Kazuyuki Shibuya, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/661,365

(22) Filed: Oct. 23, 2019

(65) Prior Publication Data
US 2020/0059674 A1 Feb. 20, 2020

Related U.S. Application Data

(63) Continuation of application No. PCT/JP2017/016311, filed on Apr. 25, 2017.

(51) Int. Cl.
*H04N 19/44* (2014.01)
*H04N 19/89* (2014.01)

(52) U.S. Cl.
CPC .............. *H04N 19/89* (2014.11); *H04N 19/44* (2014.11)

(58) Field of Classification Search
None
See application file for complete search history.

(56) References Cited

U.S. PATENT DOCUMENTS

| 5,528,284 | A | 6/1996 | Iwami et al. |
| 8,144,764 | B2 * | 3/2012 | Hannuksela ........... H04N 19/89 375/240.01 |
| 8,848,790 | B2 * | 9/2014 | Fujihara ............... H04N 19/172 375/240.13 |
| 2001/0025239 | A1 | 9/2001 | Hakenberg et al. |
| 2005/0018615 | A1 | 1/2005 | Itoh et al. |

(Continued)

FOREIGN PATENT DOCUMENTS

| JP | 6-237451 A | 8/1994 |
| JP | 8-265750 A | 10/1996 |

(Continued)

OTHER PUBLICATIONS

International Search Report dated Jul. 25, 2017, issued in counterpart International Application No. PCT/JP2017/016311, w/English translation (4 pages).

*Primary Examiner* — Shadan E Haghani
(74) *Attorney, Agent, or Firm* — Westerman, Hattori, Daniels & Adrian, LLP

(57) ABSTRACT

In an image display terminal, a decoder is configured to decode a first image and a monitor is configured to display the decoded first image. The decoder is configured to decode a second image and the monitor is configured to display the decoded second image. The first image and the second image are a normal image and a non-reference image. The decoder is configured to replace all of one or more third images displayed on the monitor before the first image is displayed and the second image is displayed with the first image and decode the first image and the monitor is configured to display the decoded first image instead of each of the third images when it is determined that at least one of the third images are the lost image.

7 Claims, 22 Drawing Sheets

(56) References Cited

U.S. PATENT DOCUMENTS

| | | | |
|---|---|---|---|
| 2008/0172708 A1* | 7/2008 | Perry | H04W 72/005 725/110 |
| 2009/0323821 A1 | 12/2009 | Sugimoto et al. | |
| 2012/0121014 A1* | 5/2012 | Rusert | H04N 21/4385 375/240.12 |

FOREIGN PATENT DOCUMENTS

| | | |
|---|---|---|
| JP | 10-23435 A | 1/1998 |
| JP | 2000-308065 A | 11/2000 |
| JP | 2001-285390 A | 10/2001 |
| JP | 2003-259371 A | 9/2003 |
| JP | 2003-338830 A | 11/2003 |
| JP | 2010-45705 A | 2/2010 |
| WO | 2008/078807 A1 | 7/2008 |
| WO | 2010/099801 A1 | 9/2010 |

* cited by examiner

FIG. 6

| SN | TS (timestamp) | type | DETERMINATION RESULT |
|---|---|---|---|
| 11 | 3000 | SINGLE PACKET, VIDEO IMAGE | NORMAL IMAGE |
| 12 | 6000 | SINGLE PACKET, VIDEO IMAGE | NORMAL IMAGE |
| 13 | 6000 | SINGLE PACKET, NON-VIDEO IMAGE | |
| LOST | | | |
| 15 | 6000 | SINGLE PACKET, NON-VIDEO IMAGE | |

FIG. 7

| SN | TS (timestamp) | type | DETERMINATION RESULT |
|---|---|---|---|
| 11 | 3000 | SINGLE PACKET, VIDEO IMAGE | NORMAL IMAGE |
| 12 | 6000 | DIVIDED PACKET START, NON-VIDEO IMAGE | |
| 13 | 6000 | DIVIDED PACKET MIDDLE, NON-VIDEO IMAGE | |
| 14 | 6000 | DIVIDED PACKET END, NON-VIDEO IMAGE | |
| LOST | | | AT LEAST ONE OF TWO PACKETS IS LOST IMAGE. |
| LOST | | | AT LEAST ONE OF TWO PACKETS IS LOST IMAGE. |
| 17 | 6000 | SINGLE PACKET, NON-VIDEO IMAGE | |
| 18 | 9000 | SINGLE PACKET, NON-VIDEO IMAGE | |

FIG. 8

| SN | TS(timestamp) | type | DETERMINATION RESULT |
|---|---|---|---|
| 11 | 3000 | SINGLE PACKET, VIDEO IMAGE | NORMAL IMAGE |
| 12 | 6000 | SINGLE PACKET, NON-VIDEO IMAGE | |
| 13 | 6000 | DIVIDED PACKET START, VIDEO IMAGE | LOST IMAGE |
| LOST | | | LOST IMAGE |
| 15 | 6000 | DIVIDED PACKET END, VIDEO IMAGE | LOST IMAGE |

FIG. 9

| SN | TS(timestamp) | type | DETERMINATION RESULT |
|---|---|---|---|
| 11 | 3000 | SINGLE PACKET, VIDEO IMAGE | NORMAL IMAGE |
| 12 | 6000 | SINGLE PACKET, VIDEO IMAGE | NORMAL IMAGE |
| 13 | 6000 | SINGLE PACKET, NON-VIDEO IMAGE | |
| LOST | | | LOST IMAGE |
| 15 | 9000 | SINGLE PACKET, NON-VIDEO IMAGE | |
| 16 | 9000 | SINGLE PACKET, NON-VIDEO IMAGE | |
| 17 | 12000 | SINGLE PACKET, NON-VIDEO IMAGE | |

FIG. 10

| SN | TS(timestamp) | type | DETERMINATION RESULT |
|---|---|---|---|
| 11 | 3000 | SINGLE PACKET, VIDEO IMAGE | NORMAL IMAGE |
| 12 | 6000 | AGGREGATED PACKET, NON-VIDEO IMAGE | |
| 13 | 6000 | DIVIDED PACKET START, VIDEO IMAGE | LOST IMAGE |
| LOST | | | LOST IMAGE |
| LOST | | | LOST IMAGE |
| LOST | | | LOST IMAGE |
| LOST | | | LOST IMAGE |
| LOST | | | LOST IMAGE |
| LOST | | | LOST IMAGE |
| 20 | 15000 | DIVIDED PACKET END, VIDEO IMAGE | LOST IMAGE |

IMAGE DISPLAY TERMINAL, IMAGE TRANSMISSION TERMINAL, IMAGE DISPLAY SYSTEM, IMAGE DISPLAY METHOD, AND RECORDING MEDIUM

The present application is a continuation application based on International Patent Application No. PCT/JP2017/016311 filed on Apr. 2, 2017, the content of which is incorporated herein by reference.

BACKGROUND OF THE INVENTION

Field of the Invention

The present invention relates to an image display terminal, an image transmission terminal, an image display system, an image display method, and a recording medium.

Description of Related Art

Along with speeding up of a wireless local area network (LAN), raising utilization efficiency of a wireless LAN, and advancement of technology such as quality of service (QoS), opportunities for a device to communicate a video image through a wireless LAN have been increasing in recent years. However, effective throughput has not been improved as expected despite the advancement of such technology. The reason lies in that it is hard to occupy a band in a wireless LAN, disturbance of radio waves from other devices than those using a wireless LAN may occur, and other cases occur.

For this reason, in general environments such as houses, offices, and hot spots in cities that are affected by the influence of radio waves, it is hard to stream high-resolution, uncompressed video images in real time at the time of communication of the video images. It is necessary to compress video images in order to stream high-resolution video images in real time. MPEG2, MPEG4, and H.264 are widely used as video compression technology. H.265 has also started to become common lately.

For example, in H.264, profiles are specified in accordance with combinations of varieties of compression means corresponding to H.264. When only a limited part of means is used, there are advantages in terms of implementation load, operation load, power consumption, and prices. However, there is a profile in which high compression to secure image quality to some extent cannot be expected. In addition, when many means are used, there are disadvantages in terms of implementation load, operation load, power consumption, and prices, but there is a profile or the like that can realize high compression to secure image quality to some extent. In general, when a CPU, a memory, and dedicated hardware (encoder and decoder) are implemented in an embedded device, there are many cases in which performance of the device is inferior to that of a PC and a smart phone. In addition, there are many cases in which the performance is poor in terms of performance due to specifications or the like of dedicated hardware. For this reason, some embedded devices support only a profile called a Baseline profile in which implementation load, operation load, and power consumption are small.

A means to perform inter-prediction (prediction between images) is specified as a compression means in H.264. In the inter-prediction, the current motion compensation block refers to one or a plurality of images. The motion compensation block is a region including a plurality of pixels in the horizontal direction and a plurality of pixels in the vertical direction. In the inter-prediction, the amount of data is reduced by representing the difference of vectors between a motion compensation block in the current image and a target block of a reference destination image as a motion compensation vector. In the inter-prediction in H.264, there are two types of methods, that is to say, predictive and bi-predictive methods. In the predictive method, one image is used as a reference destination image. In the bi-predictive method, up to two images are used as a reference destination image.

One image includes one or a plurality of slices and the slice includes an aggregation of macro blocks. As the slice, the I slice, the P slice, and the B slice are defined. The I slice can include only a macro block that does not use the inter-prediction. The P slice can include a macro block that does not use the inter-prediction and a macro block that uses only the predictive method as the inter-prediction. The B slice can include a macro block that does not use the inter-prediction and a macro block that can use the predictive and bi-predictive methods as the inter-prediction.

In general, when the inter-prediction is perforated, processing is likely to be more complicated than processing executed when the inter-prediction is not performed. In the inter-prediction using the bi-predictive method in which the number of reference destination images may increase, processing is likely to be more complicated than processing in the inter-prediction using the predictive method. For this reason, in terms of power consumption at the time of decoding, power consumption in the inter-prediction using the bi-predictive method is likely to be more than power consumption in the inter-prediction using the predictive method. In the previously-described Baseline profile, only the I slice and the P slice are used and the B slice is not used. As an embedded device that supports only the Baseline profile, there is an embedded device that does not refer to an image that is two or more images away from a reference source image and refers to only an image immediately before the reference source image at the time of the inter-prediction in the P slice. In this way, implementation load, operation load, and power consumption are further reduced.

There are many cases in which the real-time transport protocol (RTP) is used as a protocol for video transmission in light of the real time property. In the RTP, it is not limited which of tire transmission control protocol (TCP) and the user datagram protocol (UDP) to use as the transport layer lower than the RTP. In video transmission in light of the real time property, there are many cases in which the UDP is adopted to place importance on the real time property rather than tire reliability. An obstacle may be present between a transmission device and a reception device, a distance between the transmission device and the reception device may increase, and other situations may occur. In such a situation, when a video image is transmitted in accordance with the RTP on a wireless LAN, signal quality may deteriorate or video transmission from a device may collide with data transmission from another device. For this reason, it is possible that a reception device is unable to receive an RTP packet when transmission on a wireless LAN tails and retransmission on the wireless LAN also fails every time. In this case, since retransmission on the transport layer in the UDP is not performed, the RTP packet does not reach the reception device and is lost.

When at least part of an image is lost, display of the image may be disturbed at a display liming of the image. Keeping displaying an image displayed immediately before the image in which loss has occurred can avoid disturbance of display. However, since the inter-prediction is used in H.264 as described above, the image in which loss has occurred may be referred to by another image. When a reference source image indirectly refers to another image, a reference destination image referred to by the reference source image refers to another image. When loss of an image has occurred, sequentially tracing reference destination images from a reference source image may reach the image in which the loss has occurred. For this reason, disturbance of display may occur not only in the image in which the loss has occurred but also in an image that directly or indirectly refers to the image in which the loss has occurred.

On the other hand, in Japanese Unexamined Patent Application, First Publication No. H8-265750, a method of accommodating an error in an I image or a P image is disclosed. Specifically, after an image in which an error has been detected, display processing of an image decoded immediately before the error has occurred is repeated until the first I image is displayed. In this way, the image immediately before the image in which the loss has occurred is displayed instead of images from the image in which the loss has occurred to another image that may directly or indirectly refer to the image in which the loss has occurred. For this reason, disturbance of display can be suppressed.

SUMMARY OF THE INVENTION

According to a first aspect of the present invention, an image display terminal includes a communicator, a monitor, a decoder, a controller, and a memory. The communicator is configured to receive an image transmitted from an image transmission terminal in a form of a communication packet including time information and order information. The image is any one of a reference image and a non-reference image, lire reference image is an image that refers to another image that temporally precedes the reference image. The non-reference image is an image that does not refer to the another image. The memory is configured to store the image received by the communicator or the image received by the communicator and decoded. The controller is configured to determine whether the image transmitted from the image transmission terminal is a normal image or a lost image on the basis of the time information and the order information. The normal image is an image transmitted from the image transmission terminal and received by the communicator without being lost. At least part of the lost image is lost. The controller is configured to determine whether the image received by the communicator is the reference image or the non-reference image. The decoder is configured to decode a first image and the monitor is configured to display the decoded first image. The decoder is configured to decode a second image and the monitor is configured to display the decoded second image. The first image and the second image are an image that has been determined as the normal image and the non-reference image. A scheduled order in which the first image is displayed on the monitor is before a scheduled order in winch the second image is displayed on the monitor. The decoder is configured to decode all of one or more third images and the monitor is configured to display all the decoded third images in a scheduled order when it is determined that all the third images are the normal image. The one or more third images are scheduled to be displayed on the monitor after the first image is displayed and before die second image is displayed. The decoder is configured to replace all the third images with the first image and decode the first image and the monitor is configured to display the decoded first image instead of each of the third images at a riming at which each of the third images is scheduled to be displayed when it is determined that at least one of the third images is the lost image.

According to a second aspect of the present invention, in the first aspect, the communication packet may include header information to which a slice type is attached. The slice type may represent whether or not the image transmitted in the form of the communication packet refers to the another image. The controller may be configured to determine whether the image received by the communicator is the reference image or the non-reference image on the basis of the slice type.

According to a third aspect of the present invention, an image display system includes an image transmission terminal and an image display terminal. The image transmission terminal includes a first communicator configured to transmit an encoded image to the image display terminal in a form of a communication packet including time information and order information. The image is any one of a reference image and a non-reference image. The reference image is an image that refers to another image that temporally precedes the reference image. The non-reference image is an image that does not refer to the another image. The image display terminal includes a second communicator, a monitor, a decoder, a controller, and a memory. The second communicator is configured to receive the image transmitted from the image transmission terminal. The memory is configured to store the image received by the second communicator or the image received by the second communicator and decoded. The controller is configured to determine whether the image received by the second communicator is a normal image or a lost image on the basis of the time information and the order information. The normal image is an image transmitted from the image transmission terminal and received by the second communicator without being lost. At least pail of the lost image is lost. The controller is configured to determine whether the image received by the second communicator is the reference image or the non-reference image. The decoder is configured to decode a first image and the monitor is configured to display the decoded first image. The decoder is configured to decode a second image and the monitor is configured to display the decoded second image. The first image and the second image are an image that has been determined as the normal image and the non-reference image. A scheduled order in which the first image is displayed on the monitor is before a scheduled order in which the second image is displayed on the monitor. The decoder is configured to decode all of one or more third images and the monitor is configured to display all the decoded third images in a scheduled order when it is determined that all the third images are the normal image. The one or more third images are scheduled to be displayed on the monitor after the first image is displayed and before the second image is displayed. The decoder is configured to replace all the third images with the first image and decode the first image and the monitor is configured to display the decoded first image instead of each of the third images at a timing at which each of the third images is scheduled to be displayed when it is determined that at least one of the third images is the lost image.

According to a fourth aspect of the present invention, in the third aspect, the second communicator may be configured to Mans mi t lost image information to the image transmission terminal when it is determined that at least one of the third images is the lost image. The first communicator may be configured to receive the lost image information from the image display terminal. The first communicator may be configured to stop transmission of the reference image until the non-reference image is transmitted to the image display terminal when the lost image information is received.

According to a fifth aspect of the present invention, an image display method includes a first step, a second step, a third step, a fourth step, a fifth step, a sixth step, and a seventh step. In the first step, a communicator receives an image transmitted from an image transmission terminal in a form of a communication packet including time information and order information. The image is any one of a reference image and a non-reference image. The reference image is an image that refers to another image that temporally precedes the reference image. The non-reference image is an image that does not refer to the another image. In the second step, a controller determines whether the image transmitted from the image nans mission terminal is a normal image or a lost image on the basis of the time information and the older information. The normal image is an image transmitted from the image transmission terminal and received by the communicator without being lost. At least pan of the lost image is lost. In the third step, the controller determines whether the image received by the communicator is the reference image or the non-reference image. In the fourth step, a decoder decodes a first image and a monitor displays the decoded first image. In the fifth step, the decoder decodes a second image and the monitor displays the decoded second image. The first image and the second image are an image that has been determined as the normal image and the non-reference image. A scheduled order in which the first image is displayed on the monitor is before a scheduled order in which the second image is displayed on the monitor. In the sixth step, the decoder decodes all of one or more third images and the monitor displays all the decoded third images in a scheduled order when it is determined that all the third images are the normal image. The one or more third images are scheduled to be displayed on the monitor after the first image is displayed and before the second image is displayed. In the seventh step, the decoder replaces all the third images with the first image and decodes the first image and the monitor displays the decoded first image instead of each of the third images at a timing at which each of the third images is scheduled to be displayed when it is determined that at least one of the third images is the lost image.

According to a sixth aspect of the present invention, an image display method includes a first step, a second step, a third step, a fourth step, a fifth step, a sixth step, a seventh step, mid an eighth step, hi the first step, an image transmission terminal transmits an encoded image to an image display terminal in a form of a communication packet including time information and order information by using a first communicator. The image is any one of a reference image and a non-reference image. The reference image is an image that refers to another image that temporally precedes the reference image. The non-reference image is an image that does not refer to the another image. In the second step, the image display terminal receives the image transmitted from the image transmission terminal by using a second communicator. In the third step, the image display terminal determines whether the image received by the second communicator is a normal image or a lost image on the basis of the tune information and the order information. The normal image is an linage transmitted from the image transmission terminal and received by the second communicator without being lost. At least part of the lost image is lost. In the fourth step, the image display terminal determines whether the image received by the second communicator is the reference image or the non-reference image. In the fifth step, the image display terminal decodes a first image and displays the decoded first image on a monitor. In the sixth step, the image display terminal decodes a second image and displays the decoded second image on the monitor. The first image and the second image are an image that has been determined as the normal image and the non-reference image. A scheduled order in which the first image is displayed on the monitor is before a scheduled order in which the second image is displayed on the monitor. In the seventh step, the image display terminal decodes all of one or more third images and displays all the decoded third images on the monitor in a scheduled order when it is determined that all the third images are the normal image. The one or more third images are scheduled to be displayed on the monitor after the first image is displayed and before the second image is displayed. In the eighth step, the image display terminal replaces all the third images with the first image, decodes the first image, and displays the decoded first image on the monitor instead of each of the third images at a timing at which each of the third images is scheduled to be displayed when it is determined that at least one of the third images is the lost image.

According to a seventh aspect of the present invention, a non-transitory computer-readable recording medium saves a program for causing a computer to execute a first step, a second step, a third step, a fourth step, a fifth step, a sixth step, and a seventh step. In the first step, the computer causes a communicator to receive an image transmitted from an image transmission terminal in a form of a communication packet including time information and order information. The image is any one of a reference image and a non-reference image. The reference image is an image that refers to another image that temporally precedes the reference image. The non-reference image is an image that does not refer to the another image. In the second step, the computer determines whether the image transmitted from the image transmission terminal is a normal image or a lost image on the basis of the time information and the order information. The normal image is an image transmitted from the image transmission terminal and received by the communicator without being lost. At least part of the lost image is lost. In the third step, the computer determines whether the image received by the communicator is the reference image or the non-reference image. In the fourth step, the computer decodes a first image and causes a monitor to display the decoded first image. In the fifth step, the computer decodes a second image and causes the monitor to display the decoded second image. The first image and the second image are an image that has been determined as the normal image and the non-reference image. A scheduled order in which the first image is displayed on the monitor is before a scheduled order in which the second image is displayed on the monitor. In the sixth step, the computer decodes all of one or more third images and causes the monitor to display all the decoded third images in a scheduled order when it is determined that all the third images are the normal image. The one or more third images are scheduled to be displayed on the monitor after the first image is displayed and before the second image is displayed. In the seventh step, the computer replaces all the third images with the first image, decodes the first image, and causes the monitor to display the decoded first image instead of each of the third images at a timing at which each of the third images is scheduled to be displayed when it is determined that at least one of the third images is the lost image.

BRIEF DESCRIPTION OF THE DRAWINGS

FIG. 6 is a reference diagram showing an example of determination regarding a normal image and a lost image in the first embodiment of the present invention.

FIG. 7 is a reference diagram showing an example of determination regarding a normal image and a lost image in the first embodiment of the present invention.

FIG. 8 is a reference diagram showing an example of determination regarding a normal image and a lost image in the first embodiment of the present invention.

FIG. 9 is a reference diagram showing an example of determination regarding a normal image and a lost image in the first embodiment of the present invention.

FIG. 10 is a reference diagram showing an example of determination regarding a normal image and a lost image in the first embodiment of the present invention.

DETAILED DESCRIPTION OF THE INVENTION

Hereinafter, embodiments of the present invention will be described with reference to the drawings.

First Embodiment

Figure 1:
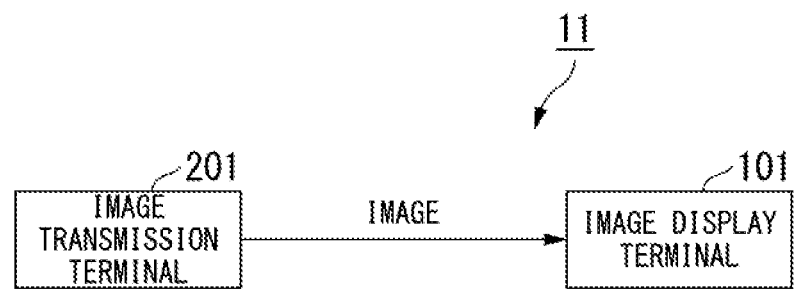
FIG. 1 is a block diagram showing a configuration of an image display system according to a first embodiment of the present invention.

FIG. 1 shows a configuration of an image display system 11 according to a first embodiment of the present invention. As shown in FIG. 1, the image display system 11 includes an image display terminal 101 and an image transmission terminal 201. The image display terminal 101 and the image transmission terminal 201 perform wireless communication. Each image (image data) constituting a video image encoded by the image transmission terminal 201 is wirelessly transmitted to the image display terminal 101 in accordance with the RTP. For example, wireless communication is performed in accordance with IEEE802.11. For example, in video transmission by the RTP, the UDP is used as a protocol of the transport layer. In FIG. 1, one image display terminal 101 and one image transmission terminal 201 are shown. A plurality of image display terminals 101 or a plurality of image transmission terminals 201 may be present.

For example, an encoder of the image transmission terminal 201 encodes a video image saved on a storage medium of the image transmission terminal 201. The encoder of the image transmission terminal 201 may encode a video image temporarily saved on the storage medium of the image transmission terminal 201. The encoder of the image transmission terminal 201 may encode a video image generated by an imaging device (image sensor). The image transmission terminal 201 may receive a video image in a wired or wireless manner from a terminal outside the image transmission terminal 201 and the encoder of the image transmission terminal 201 may encode the video image.

An encoded video image may be saved on the storage medium of the image transmission terminal 201. An encoded video image may be temporarily saved on the storage medium of the image transmission terminal 201. The image transmission terminal 201 may receive an encoded video image in a wired or wireless manner from a terminal outside the image transmission terminal 201.

Encoding is performed, for example, in accordance with H.264. Encoding may be performed in accordance with another method in which the inter-prediction is performed, such as MPEG2, MPEG4, and H.265 other than H.264. At the rime of the inter-prediction using the P slice in any method, encoding is performed not by referring to an image that is two or more images away from a reference source image but by referring to only an image immediately before the reference source image.

Figure 2:
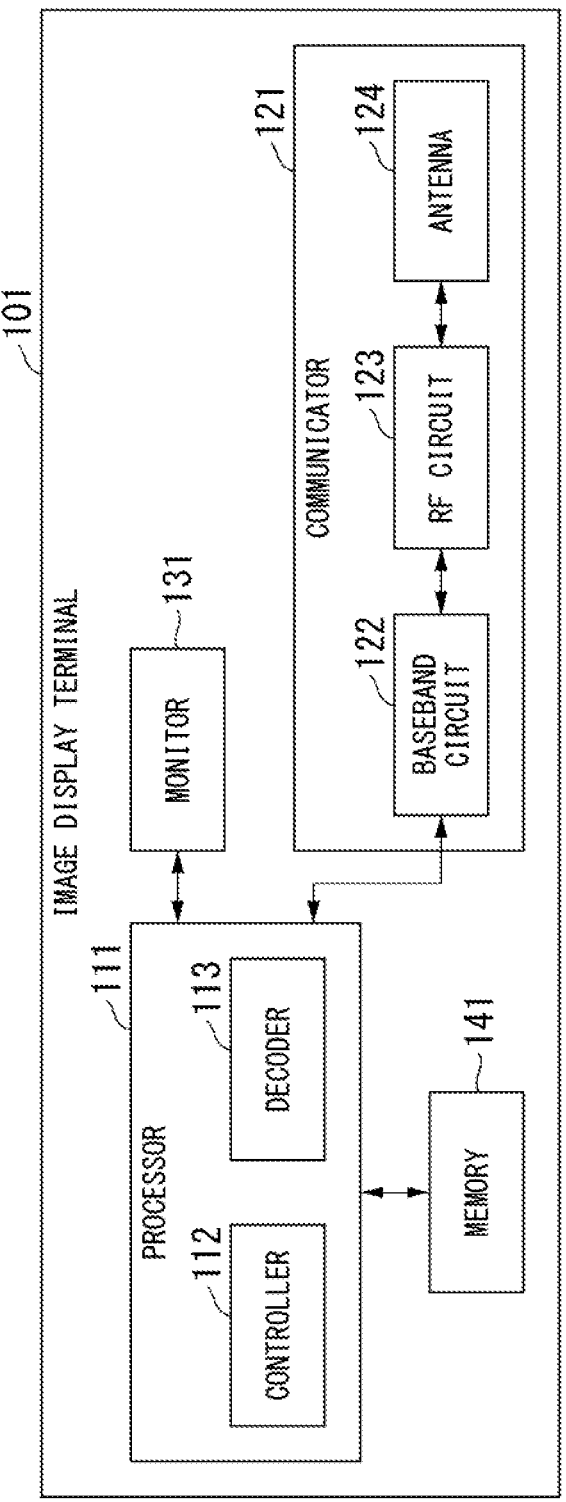
FIG. 2 is a block diagram showing a hardware configuration of an image display terminal according to the first embodiment of the present invention.

FIG. 2 shows a hardware configuration of the image display terminal 101. As shown in FIG. 2, the image display terminal 101 includes a processor 111, a communicator 121 (second communicator), a monitor 131, and a memory 141.

Figure 3:
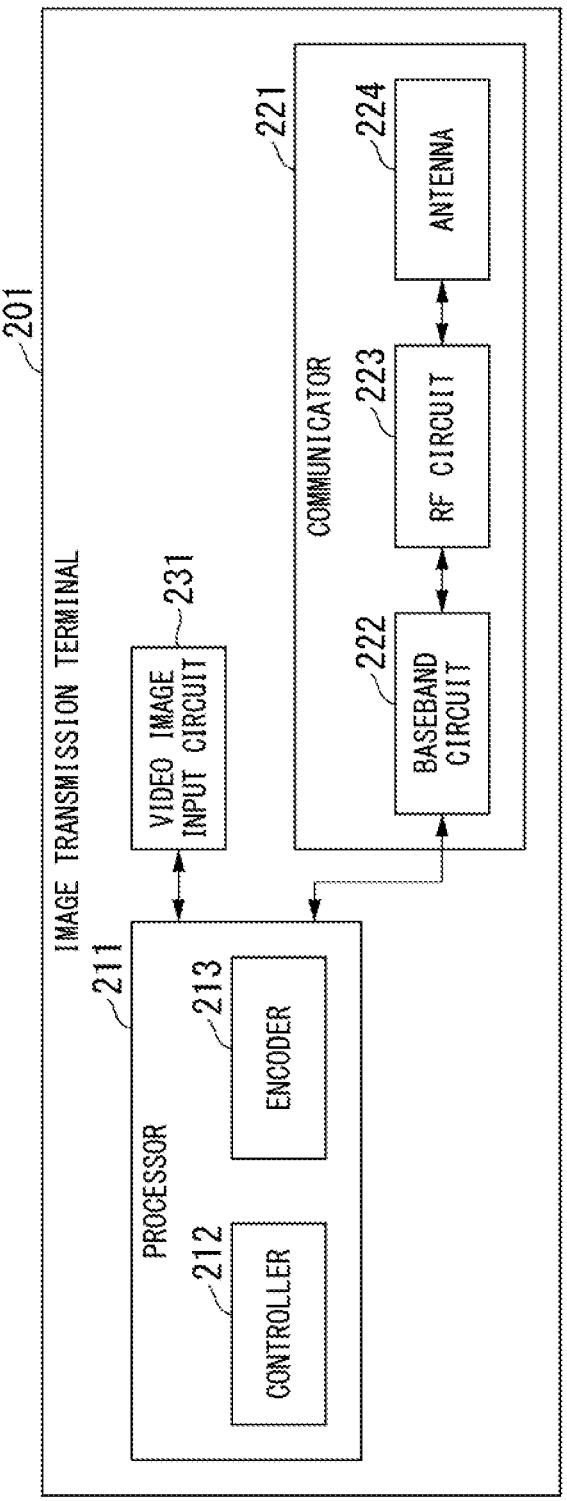
FIG. 3 is a block diagram showing a hardware configuration of an image transmission terminal according to the first embodiment of the present invention.

FIG. 3 shows a hardware configuration of the image transmission terminal 201. As shown in FIG. 3, the image transmission terminal 201 includes a processor 211, a communicator 221 (first communicator), and a video image input circuit 231.

A schematic configuration of the image display terminal 101 and the image transmission terminal 201 will be described. The processor 111 includes a controller 112 (control unit) and a decoder 113. The communicator 121 receives an image transmitted from the image transmission terminal 201 in a form of a communication packet including time information and order information. The image is any one of a reference image and a non-reference image. The reference image is an image that refers to another image that temporally precedes the reference image. The non-reference image is an image that does not refer to another image. The memory 141 stores the image received by the communicator 121 or an image received by the communicator 121 and decoded.

The controller 112 determines whether an image transmitted from the image transmission terminal 201 is a normal image or a lost image on the basis of the rime information and the order information. An image transmitted from the image transmission terminal 201 and received by the communicator 121 without being lost is the normal image. At least part of the lost image is lost. The controller 112 determines whether an image received by the communicator 121 is the normal image or the lost image.

The decoder 113 decodes a first image and the monitor 131 displays the decoded first image. The decoder 113 decodes a second image and the monitor 131 displays the decoded second image. The first image and the second image are an image that has been determined as the normal image and the non-reference image. A scheduled order in which the first image is displayed on the monitor 131 is before a scheduled order in which the second image is displayed on the monitor 131.

When it is determined that all of one or more third images are the normal images, the decoder 113 decodes all the third images and the monitor 131 displays all the decoded third images in a scheduled order. The one or more third images are scheduled to be displayed on the monitor 131 after the first image is displayed and before the second image is displayed. When it is determined that at least one of the third images is the lost image, the decoder 113 stops decoding of all the third images and the monitor 131 displays the decoded first image instead of each of the third images at a timing at which each of the third images is scheduled to be displayed.

The communicator 221 transmits an encoded image to the image display terminal 101 in a form of a communication packet including the time information and the order information.

A detailed configuration of the image display terminal 101 and the image transmission terminal 201 will be described. For example, the processor 111 is at least one of a central processing unit (CPU), a digital signal processor (DSP), and a graphics processing unit (GPU). The image display terminal 101 may include one or a plurality of processors. In FIG. 2, one processor 111 is shown. The controller 112 and the decoder 113 may be constituted by different processors.

For example, the functions of the processor 111 may be realized as functions of software when the processor 111 reads a program including commands defining the operations of the processor 111 and executes the read program. Tins program, for example, may be provided by using a "computer-readable storage medium" such as a flash memory. In addition, the program described above may be transmitted from a computer including a storage device and the like in which this program is stored to the image display terminal 101 through a transmission medium or by using carrier waves in a transmission medium. The "transmission medium" transmitting a program is a medium that has a function of transmitting information such as a network (communication network) including the Internet and the like or a communication circuit line (communication line) including a telephone circuit line and the like. In addition, the program described above may realize at least some of the functions described above. Furthermore, the program described above may be a differential file (differential program) that can realize the functions described above in combination with a program that has already been recorded in a computer. The controller 112 and the decoder 113 function m accordance with a software program operating on the processor 111.

The image display terminal 101 may include one or a plurality of logic circuits. For example, the logic circuit is at least one of a dedicated IC, an application specific integrated circuit (ASIC), and a field-programmable gate array (FPGA). The controller 112 and the decoder 113 may be constituted by the above-described logic circuit. The controller 112 and the decoder 113 may be constituted by different logic circuits.

The controller 112 controls the decoder 113, a baseband circuit 122, and a monitor 131. The decoder 113 decodes an encoded image received from the image transmission terminal 201 by the communicator 121 on the basis of air instruction from the controller 112. Encoding is, for example, performed in accordance with H.264. Decoding is also performed in accordance with H.264. Encoding and decoding may be performed in accordance with another method in which the inter-prediction is performed, such as MPEG2, MPEG4, and H.265 other than H.264.

For example, the communicator 121 is a wireless module. For example, the communicator 121 performs operations specified by IEEE802.11. The communicator 121 includes the baseband circuit 122, an RF circuit 123, and an antenna 124.

The baseband circuit 122 performs digital signal processing in accordance with an instruction from the processor 111 and converts a digital signal to an analog signal through D/A conversion. The analog signal generated by the baseband circuit 122 is output to the RF circuit 123. In addition, the baseband circuit 122 converts an analog signal output from the RF circuit 123 to a digital signal through AD conversion and performs processing on the digital signal. Part of processing in a media access control (MAC) layer out of processing performed on the digital signal by the baseband circuit 122 is controlled by the processor 111. The MAC layer is included in the data link layer.

The RF circuit 123 modulates the analog signal output from the baseband circuit 122 into an analog signal of a frequency band of carrier waves. The analog signal acquired through modulation performed by the RF circuit 123 is output to the antenna 124. In addition, the RF circuit 123 demodulates an analog signal of the frequency band of carrier waves output from the antenna 124. The analog signal demodulated by the RF circuit 123 is output to the baseband circuit 122. The antenna 124 converts the analog signal output from the RF circuit 123 into radio waves and transmits the radio waves to the image transmission terminal 201. In addition, the antenna 124 receives radio waves transmitted from the image transmission terminal 201 and converts the received radio waves into an analog signal. Die analog signal processed by the antenna 124 is output to the RF circuit 123.

As shown in FIG. 2, the antenna 124 is disposed inside the communicator 121. The antenna 124 may be disposed outside the communicator 121.

The controller 112 receives an image from the image transmission terminal 201 by using the communicator 121. Specifically, the controller 112 controls the communicator 121 such that an image is received from the image transmission terminal 201. In other words, the controller 112 causes the communicator 121 to receive an image transmitted from the image transmission terminal 201. In tins way, the communicator 121 receives an image from the image transmission terminal 201. The controller 112 transmits information to the image transmission terminal 201 by using the communicator 121. Specifically, the controller 112 controls the communicator 121 such that information is transmitted to the image transmission terminal 201. In other words, the controller 112 causes the communicator 121 to transmit information for the image transmission terminal 201. In this way, the communicator 121 transmits information to the image transmission terminal 201.

For example, the monitor 131 is at least one of a liquid crystal display and an organic electro luminescence (EL) display. The monitor 131 displays an image decoded by the decoder 113.

The memory 141 is a volatile or nonvolatile storage device. For example, the memory 141 is at least one of a random access memory (RAM), a dynamic random access memory (DRAM), a static random access memory (SRAM), an electrically erasable programmable read-only memory (EEPROM), and a flash memory.

For example, the processor 211 is at least one of a CPU, a DSP, and a GPU. The image transmission terminal 201 may include one or a plurality of processors. In FIG. 3, one processor 211 is shown. The processor 211 includes a controller 212 and an encoder 213. The controller 212 and the encoder 213 may be constituted by different processors.

For example, the functions of the processor 211 may be realized as functions of software when the processor 211 reads a program including commands defining the operations of the processor 211 and executes the read program. This program can be realized similarly to the program that realizes the functions of the processor 111.

The image transmission terminal 201 may include one or a plurality of logic circuits. For example, the logic circuit is at least one of a dedicated IC, an ASIC, and an FPGA. The controller 212 and the encoder 213 may be constituted by the above-described logic circuit. The controller 212 and the encoder 213 may be constituted by different logic circuits.

The controller 212 controls the encoder 213, a baseband circuit 222, and the video image input circuit 231. The encoder 213 encodes an image input from the video image input circuit 231 on the basis of an instruction from the controller 212.

For example, the communicator 221 is a wireless module. For example, the communicator 221 performs operations specified by IEEE802.11. The communicator 221 includes the baseband circuit 222, an RF circuit 223, and an antenna 224.

The baseband circuit 222 performs digital signal processing in accordance with an instruction from the processor 211 and converts a digital signal to an analog signal through D-A conversion. The analog signal generated by the baseband circuit 222 is output to the RF circuit 223. In addition, the baseband circuit 222 converts an analog signal output from the RF circuit 223 to a digital signal through A/D conversion and performs processing on the digital signal. Part of processing in a MAC layer out of processing performed on the digital signal by the baseband circuit 222 is controlled by the processor 211.

The RF circuit 223 modulates the analog signal output from the baseband circuit 222 into an analog signal of a frequency band of carrier waves. The analog signal acquired through modulation performed by the RF circuit 223 is output to the antenna 224. In addition, the RF circuit 223 demodulates an analog signal of the frequency band of carrier waves output from the antenna 224. The analog signal demodulated by the RF circuit 223 is output to the baseband circuit 222. The antenna 224 converts the analog signal output from the RF circuit 223 into radio waves and transmits the radio waves to the image display terminal 101. In addition, the antenna 224 receives radio waves transmitted from the image display terminal 101 and converts the received radio waves into an analog signal. The analog signal processed by the antenna 224 is output to the RF circuit 223.

As shown in FIG. 3; the antenna 224 is disposed inside the communicator 221. The antenna 224 may be disposed outside the communicator 221.

The controller 212 transmits an image to the image display terminal 101 by using the communicator 221. Specifically, the controller 212 controls the communicator 221 such that an image is transmitted to the image display terminal 101. In other words, the controller 212 causes the communicator 221 to transmit an image for the image display terminal 101. In this way, the communicator 221 transmits an image to the image display terminal 101. The controller 212 receives information from the image display terminal 101 by using the communicator 221. Specifically, the controller 212 controls the communicator 221 such that information is received from the image display terminal 101. In other words, the controller 212 causes the communicator 221 to receive information transmitted from the image display terminal 101. In this way, the communicator 221 receives information from the image display terminal 101.

For example, the video image input circuit 231 is an imaging device (image sensor). The video image input circuit 231 performs imaging and generates an image (image data). The video image input circuit 231 generates a video image including images of a plurality of frames by performing imaging a plurality of times. An image generated by the video image input circuit 231 is input to the processor 211. The video image input circuit 231 may be one of various kinds of storage mediums such as a hard disk drive and a semiconductor memory not shown. An image may be read from the video image input circuit 231 constituted by a storage medium and the image may be input to the processor 211. An image may be received from a different terminal than an image display terminal through the communicator 221 or another communicator not shown and the image may be input to the processor 211. Therefore, the image transmission terminal 201 may not include the video image input circuit 231.

The video image input circuit 231 may be a storage medium storing an encoded image. An encoded image may be read from the video image input circuit 231 and the image may be input to the processor 211. An encoded image may be received from a different terminal than an image display terminal through the communicator 221 or another communicator not shown and the image may be input to the processor 211. Therefore, the image transmission terminal 201 may not include the encoder 213.

A video image is input from the video image input circuit 231 to the controller 212. A video image may be directly input from the video image input circuit 231 to the encoder 213 without using the controller 212.

The image transmission terminal 201 may include a configuration not shown in FIG. 3. For example, the image transmission terminal 201 may include at least one of an operation unit and a memory.

Figure 4:
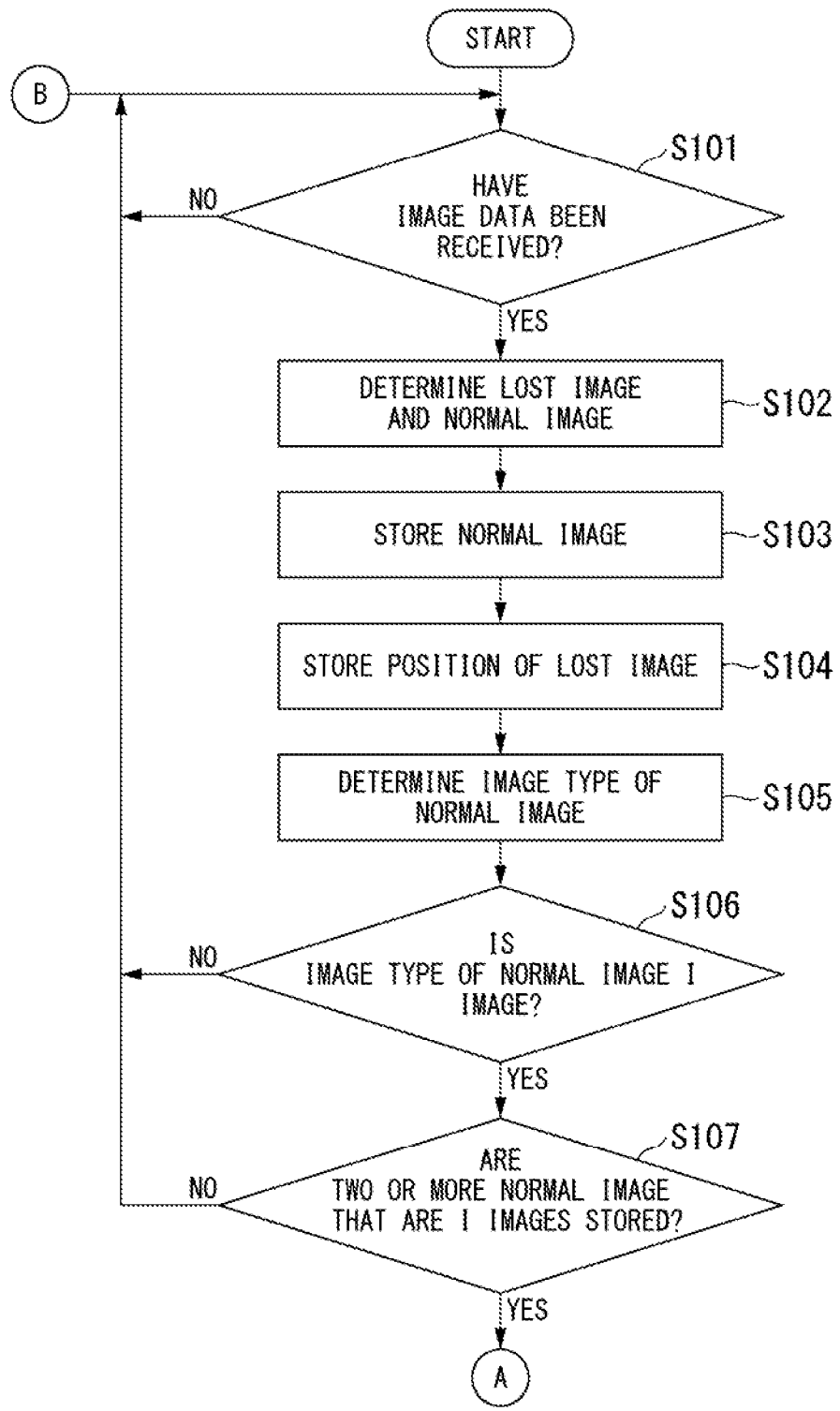
FIG. 4 is a flow chart showing a procedure of an operation of the image display terminal according to the first embodiment of the present invention.
Figure 5:
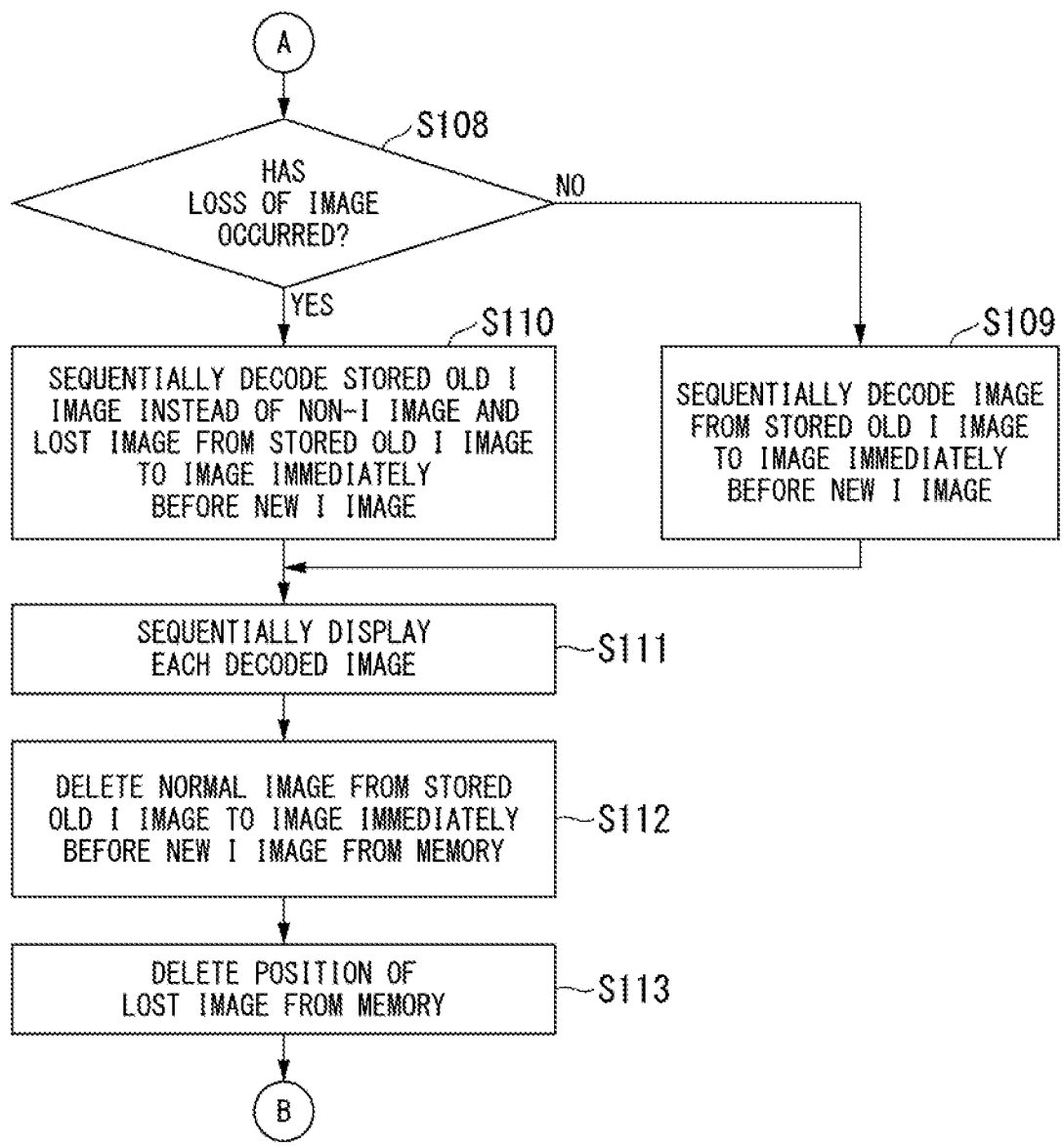
FIG. 5 is a flow chart showing a procedure of an operation of the image display terminal according to the first embodiment of the present invention.

An operation of the image display terminal 101 will be described. FIG. 4 and FIG. 5 show the operation of the image display terminal 101. An example in which one image includes only one slice in a video image transmitted from the image transmission terminal 201 will be described. In addition, an example in which encoding and decoding are performed in accordance with H.264 and a communication packet is an RTP packet will be described.

(Step S101)

When all image is transmitted from the image transmission terminal 201, the communicator 121 receives the image. The controller 112 monitors the communicator 121 and determines whether or not data constituting one image of an H.264 video image or part of the data have been received. When the data have not been received, this determination is performed again. When the data have been received, the processing in Step S102 is executed.

(Step S102)

The controller 112 performs determination on the basis of the most recently received data and the data that was received before the most recently received data, in other words, the controller 112 determines whether each of these pieces of data is the normal image or the lost image. Out of data that have been received, data for which the determination in Step S102 has already been completed are not subject to this determination.

The determination regarding the normal image and the lost image is performed as follows. In a case in which image data of H.264 are transmitted in the RTP, the header of the RTP and the payload are set, for example, in accordance with RFC 6184. In the RTP header format specified in RFC 3550 "5.1 RTP Fixed Header Fields", there is a timestamp field that is time information. In this field, a time point at which an analog signal of a video image corresponding to the head data of a slice within the payload of the RTP packet was sampled (A/D conversion) by the encoder 213 is set. For this reason, even when one slice is divided into a plurality of RTP packets, values of their timestamps are the same.

The amount of increase in a value of a timestamp between a certain image and the following image is a value acquired by adding a value inversely proportional to a frame rate of a video image transmitted from the image transmission terminal 201 and a value due to fluctuation of processing by the encoder 213. The frame rate of a video image is the number of images per one second. For example, the frame rate of a certain video image is 30 fps. A certain image of the video image includes only one slice. The slice is divided into three RTP packets, i.e., an RTP packet 1 to an RTP packet 3 and the RTP packets are transmitted. The following image also includes only one slice and is divided into four RTP packers, i.e., an RTP packet 4 to an RTP packet 7, and the RTP packets are transmitted. In this example, one image is divided into a plurality of RTP packets in accordance with the FU indicator. FU header format specified in FIG. 14, FIG. 15, and "5.8. Fragmentation Units (FUs)" of RFC 6184. A value of a timestamp in accordance with RFC 6184 becomes a new value every 90 kHz. When a value of a timestamp of the RTP packet 1 is 3000. values of timestamps of the RTP packets 2 and 3 are also 3000. Each value of timestamps of the RTP packets 4 to 7 is 6000 that represents a time point 1/30 second after the time point corresponding to the RTP packets 1 to 3.

In addition, in the RTP header formal specified in RFC 3550 "5.1 RTP Fixed Header Fields", there is a field called a sequence number (SN) that is the order information. In this field, a value that increases by one for one RTP packet is set. When values of SN of sequentially received RTP packets are not consecutive and part of the values is lost in the reception side, the controller 112 can determine that the RTP packet that has a value of SN corresponding to the lost value has been lost.

The controller 112 performs determination regarding the lost image and the normal image on the basis of a timestamp and a value of SN of a received RTP packet as follows.

The controller 112 confirms a value of SN of a target RTP packet for the determination. When the value of SN is consecutive from a value of SN of an RTP packet that has been received and a concluded image is present in a timestamp group, the controller 112 determines that image data included in the target RTP packet for the determination are the normal image.

The timestamp group includes a plurality of RTP packets for which values of timestamps are the same. In an example in winch an image is divided into the RTP packets 1 to 3 and the following image is divided into the RTP packets 4 to 7, the timestamp group is as follows. The RTP packets 1 to 3 constitute a timestamp group in which a value of a timestamp is 3000. The RTP packets 4 to 7 constitute a timestamp group in which a value of a timestamp is 6000 and that is different from the timestamp group of the RTP packets 1 to 3.

In this example, a timestamp group includes a plurality of RTP packets for which values of timestamps are the same. A plurality of RTP packets for which values of timestamps are not completely the same and the values fall in a certain range may constitute one timestamp group. For example, if a frame rate is 30 fps. RTP packets for which values of timestamps fall in a range from a time point 1/60 second before a certain time point to a time point 1/60 second after the certain time point may constitute one timestamp group. RTP packets for which values of timestamps fall in a range from a certain time point to a time point 1/30 second after the certain time point may constitute one timestamp group.

The concluded image is an image in which image data are not lost and all of the data are present. In RFC 6184. there are three types of RTP packets, i.e., a single packet, an aggregated packet, and a divided packet. A method of determination whether or not an image is the concluded image is different for each packet.

In a case in winch image data are stored in the single packet, one NALU is stored in one RTP packet. The payload after the RTP header is shown in FIG. 2 of RFC 6184.

In a case in which image data are stored in the aggregated packet, one or a plurality of NALUs are stored in one RTP packet. The RTP header and the payload are shown in FIG. 3 of RFC 6184. For example, cases in which two NALUs are included in one RTP packet are shown in FIG. 7, FIG. 8, FIG. 12, and FIG. 13 of RFC 6184.

In a case in which image data are stored in the divided packet, one NALU is divided into portions for a plurality of RTP packets and only the portion of one NALU is stored in one RTP packet. The RTP header and the payload are shown in the FU indicator, FU header format specified in FIG. 14, FIG. 15, and "5.8. Fragmentation Units (FUs)" of RFC 6184.

NALU is an abbreviation of "Network Abstraction Layer Unit". NALU is a concluded information unit including header information of H.264 and data. There are NALUs for various applications such as non-video data like an image parameter in addition to each piece of image data of a video image.

Whether the type of an RTP packet is the single packet, the aggregated packet, or the divided packet is determined as follows. When a value of Type (bits 3 to 7) within one byte from the head of the RTP payload is any one of 24 to 27 as shown in the row of "NAL Unit Type" of Table 1 of RFC 6184, the RTP packet is the aggregated packet. When the value of Type is any one of 28 and 29, the RTP packet is the divided packet. When the value of Type is any one of 1 to 23, the RTP packet is the single packet.

The controller 112 determines whether or not image data are the concluded image as follows. When a target RTP packet for determination is the single packet and a value of the Type field within the RTP packet represents image data of H.264 in Table 7-1 of H.264, an image formed of image data included in the RTP packet is the concluded image.

When a target RTP packet for determination is the aggregated packet and a value of the Type field in the head byte in each NALU within the RTP packet represents image data in Table 7-1 of H.264, an image formed of image data included in the RTP packet is the concluded image.

When a value of the S bit of FU Header within each divided packet is 1, the divided packet corresponds to the head (Start) of divided image data. When a value of the E bit of FU Header within each divided packet is 1, the divided packet corresponds to the end (End) of divided image data. When a target packet for determination is the divided packet, the determination is performed as follows. When there are the divided packet with the S bit of 1 and the divided packet with the E bit of 1 in the same timestamp group and no SN is lost between the two divided packets and Type in FU Header represents image data in Table 7-1 of H.264, an image formed of image data included in each divided packet is the concluded image.

When values of SN are not consecutive and an RTP packet is lost, determination is performed as follows. In each timestamp group from a first timestamp group to a second timestamp group, an image formed of image data included in an RTP packet of a timestamp group in which no concluded image is present is the lost image (non-normal image). The first timestamp group corresponds to a timestamp of the RTP packet immediately before the lost RTP packet. The second timestamp group corresponds to a timestamp of the RTP packet immediately after the lost RTP packet.

FIGS. 6 to 10 show examples of determination regarding the normal image and the lost image. FIG. 6 shows that the RTP packet with SN of 14 is lost. Since the timestamp (TS) of the RTP packet with SN of 13 preceding the lost RTP packet and TS of the RTP packet with SN of 15 following the lost RTP packet are 6000, TS of the lost RTP packet is also 6000. In the timestamp group with TS of 6000, video data are received by using the single packet with SN of 12 and the concluded image is present. For this reason, the data included in the lost RTP packet with SN of 14 are not a video image. Thus, the controller 112 can determine that the image in the timestamp group with TS of 6000 is the normal image.

FIG. 7 shows that the RTP packets with SNs of 15 and 16 are lost. Since TS of the RTP packet with SN of 14 preceding the lost RTP packets and TS of the RTP packet with SN of 17 following the lost RTP packets are 6000, TSs of the lost RTP packets are also 6000. Regarding the timestamp group with TS of 6000, at the time point at which the RTP packet with SN of 17 is received, a video image has not been received yet. There is a possibility that a video image with TS of 6000 is received by using an RTP packet after the RTP packet with SN of 17. For this reason, it is impossible to determine whether the data included in the two lost RTP packets are a video image or a non-video image.

Since TS of the RTP packet with SN of 18 is 9000, it is decided that a video image is not received in the timestamp group with TS of 6000. For this reason, no concluded image is present in the timestamp group with TS of 6000. Thus, the controller 112 can determine that the image in the timestamp group with TS of 6000 is the lost image. At least one of the two lost RIP packets with SN of 15 and 16 includes a video image. It does not relate to the determination regarding the lost image and the normal image which of the two lost RTP packets includes video data or whether both of them include video data.

FIG. 8 shows that the RTP packet with SN of 14 is lost. Since TS of the RTP packet with SN of 13 preceding the lost RTP packet and TS of the RTP packet with SN of 15 following the lost RTP packet are 6000, TS of the lost RTP packet is also 6000. The RTP packet with SN of 13 is Start of the divided packet and includes a video image. The RTP packet with SN of 15 is End of the divided packet and includes a video image. For this reason, the lost RTP packet is at the middle of the divided packet and includes a video image. Thus, the controller 112 can determine that no concluded image is present in the timestamp group with TS of 6000 and the image in the timestamp group is the lost image.

FIG. 9 shows that the RTP packet with SN of 14 is lost. TS of the RTP packet with SN of 13 preceding the lost RTP packet is 6000 and TS of the RTP packet with SN of 15 following the lost RTP packet is 9000. For this reason, TS of the lost RTP packet is either 6000 or 9000. In the timestamp group with TS of 6000, video data are received by using the single packet with SN of 12 and the concluded image is present. Therefore, it is decided that the normal image is present in the timestamp group with TS of 6000. For this reason, a video image included in the lost RTP packet is not at least a video image with TS of 6000.

However, at the time point at which the RTP packet with SN of 15 is received, it is impossible to make a decision whether the data included in the lost RTP packet are a non-video image with TS of 6000, a video image with TS of 9000, or a non-video image with TS of 9000. When the RTP packet with SN of 17 is received, TS of the RTP packet is 12000. For this reason, it is determined that no video image is present in the timestamp group with TS of 9000. Therefore, the data included in the RTP packet with SN of 14 are a video image with TS of 9000. Thus, the controller 112 can determine that no concluded image is present in the timestamp group with TS of 9000 and the image in the timestamp group is the lost image.

FIG. 10 shows that the RTP packets with SNs of 14 to 19 are lost. TS of the RTP packet with SN of 13 preceding the lost RTP packets is 6000 and TS of the RTP packet with SN of 20 following the lost RTP packets is 15000. For this reason, at least the RTP packet with TS of 9000 and the RTP packet with TS of 12000 ate lost. There is a possibility that the RTP packet with TS of 6000 or 15000 is also lost in addition to these RTP packets.

The RTP packet with SN of 13 is Start of the divided packet and includes a video image. The RTP packet with SN of 20 is End of the divided packet and includes a video image. For this reason, it appears that the RTP packets with SNs of 14 to 19 are part of the divided packet containing the RTP packets with SNs of 13 to 20 and apparently include a video image.

However, TS of the RTP packet with SN of 13 and TS of the RTP packet with SN of 20 are different from each other. For this reason, End of the divided packet associated with the RTP packet with SN of 13 that is Start of the divided packet is any one of the lost RTP packets. Similarly, Start of the divided packet associated with the RTP packet with SN of 20 that is End of the divided packet is any one of the lost RTP packets.

For this reason, no concluded image is present in each of the timestamp groups with TSs of 6000 and 15000. In addition, no concluded image is present in each of the timestamp groups with TSs of 9000 and 12000. Thus, the controller 112 can determine that no concluded image is present in the timestamp groups with TSs of 6000, 9000, 12000, and 15000 and the image in each of the timestamp groups is the lost image. Although the RTP packets with TSs of 9000 and 12000 are not received the controller 112 can determine that the images in the timestamp groups with TSs of 9000 and 12000 are the lost images.

It has nothing to do with the determination regarding the lost image and the normal image which of the six lost RTP packets is End of the divided packet associated with the RTP packet with SN of 13 that is Start of the divided packet and which of the six lost RTP packets includes video data. It has nothing to do with the determination regarding the lost image and the normal image which of the six lost RTP packets is Start of the divided packet associated with the RTP packet with SN of 20 that is End of the divided packet and which of the six lost RTP packets includes video data. It has nothing to do with the determination regarding the lost image and the normal image which of the six lost RTP packets includes a video image with TS of 9000 or 12000. It has nothing to do with the determination regarding the lost image and the normal image which of the six lost RTP packets includes a non-video image with TS of 6000, 9000, 12000, or 15000.

(Step S103)

The remainder of the operation shown in FIG. 4 will be described. The controller 112 stores the image that has been determined as the normal image in Step S102 on the memory 141. In a case in which an image in at least one time stamp group has been determined as the lost image, if the normal image is an image before the lost image, the normal image may be stored. If the normal image is an image after the lost image, the determination in Step S105 and Step S106 described below may be performed and an image no later than the image immediately before the image of which the image type is the I image may not be stored.

(Step S104)

As a result of the determination in Step S102, when an image in at least one timestamp group is the lost image, the controller 112 stores the position of the lost image on the memory 141. In other words, the controller 112 stores, car the memory 141. information that represents the timestamp group to which the lost image corresponds between two timestamp groups out of the timestamp groups of the normal images stored in Step S103. The controller 112 may store TS on the memory 141. Alternatively, the controller 112 stores, on the memory 141, information that represents the image to which the lost image corresponds between two normal images out of the normal images stored in Step S103. The controller 112 may store SN on the memory 141.

(Step S105)

As a result of the determination in Step S102, when an image in at least one timestamp group is the normal image, the controller 112 determines the image type of the normal image. The image type is any care of the I image and the P image. The image type can be determined on the basis of the value of the slice_type included in the slice header shown in Table 7-6 of H.264. In a case in which one image is constituted by one slice and the Baseline profile is used, if the value of the slice type is any one of 2 and 7, the image is the I image. Since the I image is constituted by the I slice, the I image is the non-reference image that does not refer to another image. On the other hand, if the value of the slice type is any one of 0 and 5. the image is the P image. Since the P image is constituted by the P slice, the P image is the reference image that refers to and an image no later than the image immediately before the image of which the image type is the I image may not be stored.

(Step S104)

As a result of the determination in Step S102, when an image in at least one timestamp group is the lost image, the controller 112 stores the position of the lost image on the memory 141. In other words, the controller 112 stores, car the memory 141, information that represents the timestamp group to which the lost image corresponds between two timestamp groups out of the timestamp groups of the normal images stored in Step S103. The controller 112 may store TS on the memory 141. Alternatively, the controller 112 stores, on the memory 141, information that represents the image to which the lost image corresponds between two normal images out of the normal images stored in Step S103. The controller 112 may store SN on the memory 141.

(Step S105)

As a result of the determination in Step S102, when an image in at least one timestamp group is the normal image, the controller 112 determines the image type of the normal image. The image type is any care of the I image and the P image. The image type can be determined on the basis of the value of the slice type included in the slice header shown in Table 7-6 of H.264. In a case in which one image is constituted by one slice and the Baseline profile is used, if the value of the slice type is any one of 2 and 7, the image is the I image. Since the I image is constituted by the I slice, the I image is the non-reference image that does not refer to another image. On the other hand, if the value of the slice type is any one of 0 and 5, the image is the P image. Since the P image is constituted by the P slice, the P image is the reference image that refers to (Step S108)

The controller 112 determines whether or not the position of the lost image is stored on the memory 141 In this way, the controller 112 determines whether or not loss of an image has occurred. When the position of the lost image is not stored on the memory 141, that is, loss of an image has not occurred, the processing in Step S109 is executed. When the position of the lost image is stored on the memory 141, that is, loss of an image has occurred, the processing in Step S110 is executed.

(Step S109)

The controller 112 causes the decoder 113 to sequentially decode images from the stored old I image (first image) to the image immediately before the new I image (second image). In this way, the decoder 113 decodes the first image. In addition, the decoder 113 decodes one or more third images that are scheduled to be displayed on the monitor 131 after the first image is displayed and before the second image is displayed. When two I images are consecutive, the controller 112 causes the decoder 113 to decode only the old I image.

When three or more normal images that are the I images are stored, the controller 112 may cause the decoder 113 to sequentially decode images from the oldest I image to the image immediately before the second oldest I image. Alternatively, the controller 112 may cause the decoder 113 to sequentially decode images from the oldest I image to the image immediately before the I image two or more images newer than the oldest I image in chronological order.

(Step S110)

The controller 112 causes the decoder 113 to sequentially decode images from the old I image to the image immediately before the following new I image. Before the decoding is performed, out of images from the stored old I image to the image immediately before the following new I image, the lost image and all of the images that are not the I image are replaced with the old I image. After the replacement is performed, the decoder 113 decodes the old I image. Since the above-described replacement is performed, the decoder 113 stops decoding of all the third images.

At the time of the above-described replacement, the controller 112 may replace some values of the H.264 header of each image that has been replaced with the old I image. For example, the controller 112 rewrites the frame_num included in the slice header of H.264. When loss of an image has occurred, the controller 112 rewrites the value of the frame_num of the image following the old I image and the values of the frame_num of the subsequent images with an incremented value on the basis of the value of the frame_num of the old I image.

In the rewriting, when the incremented value equals to $2^{(4+log2\_max\_frame\_num\_minus4)}$, the value of the frame_num returns to 0. That is, when log2_max_frame_num_minus4 is 0, the value of the frame_num changes as 0, 1, * * *, 14, 15, 0, 1, * * *. log2_max_frame_num_minus4 is included in the sequence parameter set (SPS).

When loss of an image has occurred, the frame_num of the old I image is 13, and four images are present before the following I image, these four images are replaced with the old I image. The value of the frame_num is rewritten as 14, 15, 0, and 1 in order from the old image and each of the images is decoded.

For example. SPS is received as a kind of NALU. SPS may be received through communication irrelevant to H.264. SPS may be received through another communicator not shown. SPS may be acquired through a storage medium not shown. SPS may be input from an operation unit not shown by a user.

When three or more normal images that are the I images ate stored the controller 112 may cause the decoder 113 to sequentially decode images from the oldest I image to the image immediately before the newest I image. Specifically, when at least one of images after the oldest I image and before the newest I image is the lost image, the controller 112 performs the above-described rewriting and causes the decoder 113 to sequentially decode each of the images. When none of the images after the oldest I image and before the newest I image are the lost images, the controller 112 causes the decoder 113 to sequentially decode each of the images through the method in Step S109.

When three or more normal images that are the I images are stored, the controller 112 may cause the decoder 113 to sequentially decode images from the oldest I image to the image immediately before the I image two or more images newer than the oldest I image in chronological order. Specifically, when at least one of images after the oldest I image and before the I image two or more images newer than the oldest I image is the lost image, the controller 112 performs the above-described rewriting and causes the decoder 113 to sequentially decode each of the images. When none of the images after the oldest I image and before the I image two or more images newer than the oldest I image are the lost images, the controller 112 causes the decoder 113 to sequentially decode each of the images through the method in Step S109.

(Step S111)

The controller 112 causes the monitor 131 to sequentially display each of the images decoded by the decoder 113 in Step S109 or Step S110. In this way, the monitor 131 sequentially displays each of the images decoded by the decoder 113.

The order in which the monitor 131 displays images matches the order in which the decoder 113 performs decoding. The order in which the monitor 131 displays images may match the order in which the images are received by the communicator 121. The controller 112 may calculate the picture order count in accordance with H.264 on the basis of various parameters in the H.264 header and data. The order in which the monitor 131 displays images may be the order in accordance with the picture order count. Data that represent the order of displaying images may be input to the image display terminal 101 from the image transmission terminal 201 through the communicator 121. another communicator not shown, or a storage medium not shown.

The monitor 131 displays images at the same timings as timings at which images from the oldest I image to the image immediately before the newest I image are scheduled to be displayed. After the processing in Step S109 is executed, the monitor 131 displays the I images and the P images from the oldest I image to the image immediately before the newest I image at the same timings as timings at which these images are scheduled to be displayed in Step S111. After the processing in Step S110 is executed, the monitor 131 displays the same I image at the same timings as timings at which images from the oldest I image to the image immediately before the newest I image are scheduled to be displayed in Step S111. In this way, the monitor 131 displays the I image the same number of times as the number of images from the oldest I image to the image immediately before the newest I image.

(Step S112)

The controller 112 deletes the normal image from the old I image to the image immediately before the following new I image out of the stored normal images from the memory 141. When three or more normal images that are the I images are stored, the image from the I image first decoded in Step S109 or Step S110 to the image immediately before the I image that has not been decoded is deleted. When the processing in Step S109 or Step S110 is executed next time, the I image that has not been decoded is treated as the old I image. When the processing in Step S109 or Step S110 is executed next time, the I image that was the second image at the time at which the processing in Step S109 or Step S110 was executed last is decoded.

In Step S112, all image may not be deleted from the memory 141. In this case, use of the normal image from the old I image to the image immediately before the following new I image is prohibited thereafter.

(Step S113)

The controller 112 deletes the position of the lost image stored on the memory 141 in Step S104 from the memory 141. Thereafter, the processing in Step S101 is executed.

In Step S113, the position of the lost image may not be deleted from the memory 141. In this case, use of the position of the lost image is prohibited thereafter.

When information that represents the end of a video image is received by the controller 112, the processing in Steps S108 to S113 may be executed without the new I image being decided in Step S106 and Step S107. In this case, images from the stored old I image to the newest image are targets for decoding in Step S109 and Step S110. In Step S110, out of images from the stored old I image to the newest image, all of the images that are not the I image are replaced with the old I image and are decoded. In Step S112, the images from the old I image to the newest image are deleted from the memory 141.

It is assumed that the communicator 121 performs the operation specified in IEEE802.11, but the communicator 121 may operate in accordance with a wireless communication method other than that.

Figure 11:
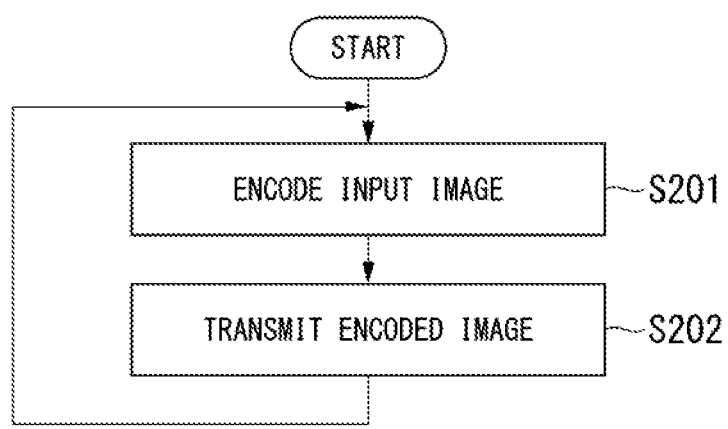
FIG. 11 is a flow chart showing a procedure of an operation of the image transmission terminal according to the first embodiment of the present invention.

An operation of the image transmission terminal 201 will be described. FIG. 11 shows the operation of the image transmission terminal 201. The image transmission terminal 201 transmits a video image and a non-video image, but transmission of the non-video image is not shown in FIG. 11.
(Step S201)

The encoder 213 encodes an image input from the video image input circuit 231 to the processor 211.
(Step S202)

The controller 212 transmits the encoded image to the image display terminal 101 by using the communicator 221. Thereafter, the processing in Step S201 is executed.

Figure 12:
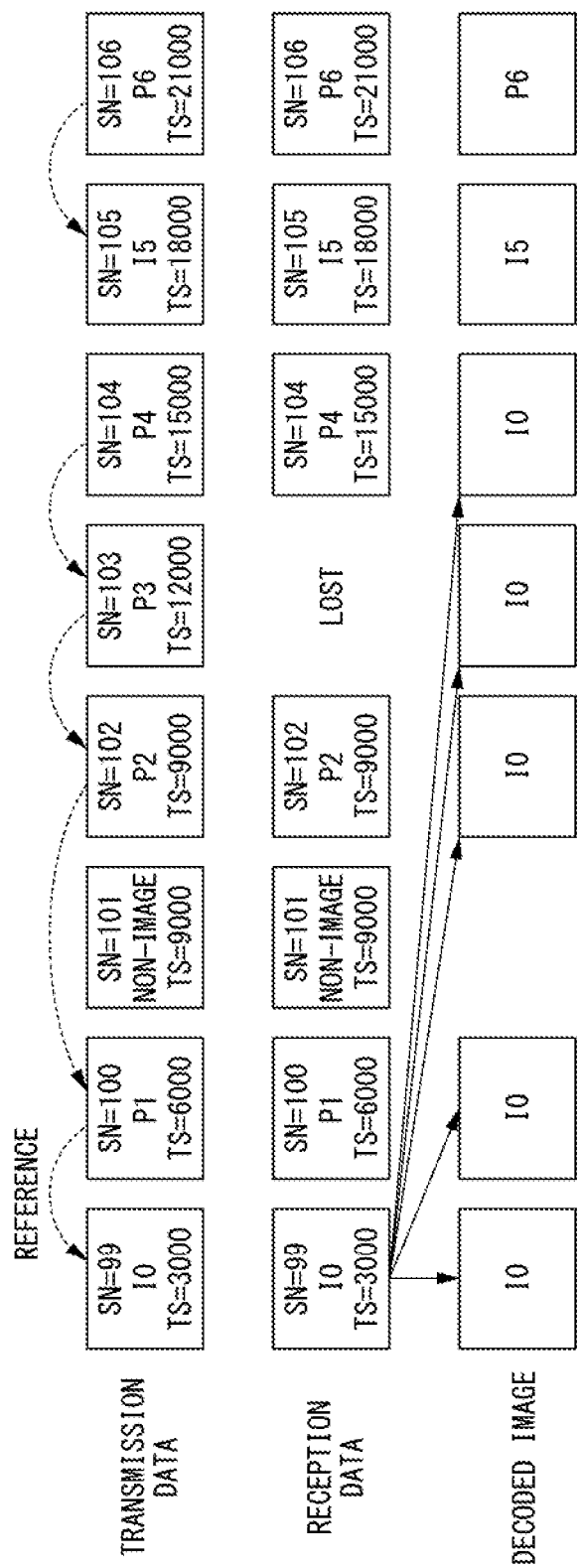
FIG. 12 is a schematic diagram showing a first operation example in the first embodiment of the present invention.

FIG. 12 shows a first operation example in the first embodiment. The right direction in FIG. 12 represents the order of data. In FIG. 12, transmission data, reception data, and a decoded image are shown. The transmission data are data transmitted from the image transmission terminal 201. The reception data are data received by the image display terminal 101. The decoded image is an image that has been decoded and is displayed by the monitor 131.

The communicator 221 transmits an image and a non-image. The non-image is non-video data such as a parameter of an image. The P image refers to the image immediately before the P image.

In the transmission data and the reception data, a sequence number (SN) and a timestamp (TS) of each piece of data are shown. I0, P1, and the like represent an image type and an identifier. The head character (I or P) represents the image type and the subsequent number represents the identifier. The data described as a non-image are non-video data. The arrow connecting two pieces of transmission data together represents the reference relationship of an image. The root of the arrow represents a reference source image and the head of the arrow represents a reference destination image. The P image that is the reference image refers to the I image or another P image one image before the P image. In a case in which data transmitted from the image transmission terminal 201 have been lost, "LOST" is written at the position corresponding to the data in the reception data.

The communicator 121 receives an I image I0 first. Although the I image is written for convenience of description, it is not recognized whether or not an image is the I image until the determination in Step S105 is performed. Since the I image I0 is the normal image, the I image I0 is stored on the memory 141 in Step S103. At this time, loss of an image has not occurred. The controller 112 determines the image type of the normal image (I image I0) and determines that the normal image is the I image in Step S105. At this time, the normal image that is the I image stored on the memory 141 is only the I image I0.

The communicator 121 receives a P image P1 next. Since the P image P1 is the normal image, the P image P1 is stored on the memory 141 in Step S103. At this time, loss of an image has not occurred. The controller 112 determines the image type of the normal image (P image P1) and determines that the normal image is the P image in Step S105.

The communicator 121 receives a non-image next. The communicator 121 receives a P image P2 next. Since the P image P2 is the normal image, the P image P2 is stored on the memory 141 in Step S103. Loss of an image has not occurred. The controller 112 determines the image type of the normal image (P image P2) and determines that the normal image is the P image in Step S105.

The communicator 121 receives a P image P4 next. Since the P image P4 is the normal image, the P image P4 is stored on the memory 141 in Step S103. However, since SN of the P image P2 received before the P image P4 is 102 and SN of the P image P4 is 104, loss of the image with SN of 103 has occurred. An image of a timestamp group with a value of a timestamp of 12000 has not been received. For this reason, the controller 112 determines that no concluded image is present in this timestamp group and the image in this timestamp group is the lost image in Step S102. The controller 112 stores the position of the lost image corresponding to TS between 9000 and 15000 in Step S104. The controller 112 determines the image type of the normal image (P image P4) and determines that the normal image is the P image in Step S105.

The P image P4 directly refers to a P image P3 that is the lost image. There is no image that indirectly refers to the lost image.

The communicator 121 receives an I image I5 next. Since the I image I5 is the normal image, the I image I5 is stored on the memory 141 in Step S103. At this time, loss of a new image has not occurred. The controller 112 determines the image type of the normal image (I image I5) and determines that the normal image is the I image in Step S105. At this point, two images, i.e., the I image I0 and the I image I5 are stored as the normal image that is the I image. The position of the lost image has been stored.

The controller 112 replaces a non-I image and the lost image out of images from the stored old I image I0 to the P image P4 immediately before the new I image I5 with the stored old I image I0 in Step S110. In other words, the controller 112 replaces the P image P1, the P image P2, the P image P4, and the P image P3 that is the lost image with the I image I0. At this time, the controller 112 may rewrite some values of the H.264 header of the I image I0 corresponding to each of the images. The controller 112 causes the decoder 113 to sequentially decode the plurality of I images I0. As shown in FIG. 12, the I images I0 are decoded instead of the P images P1 to P4.

The monitor 131 displays the decoded I images I0 in Step S111 at timings at which the I image I0 and the P images P1 to P4 are displayed, in other words, the same decoded I images I0 are sequentially displayed at timings at which four P images and one I image are displayed.

In Step S112, the images from the stored old I image I0 to the P image P4 immediately before the new I image I5 are deleted from the memory 141. In this way, the stored normal image is only the I image I5. In Step S113, the position of the lost image corresponding to TS between 9000 and 15000 is deleted from the memory 141.

After the I image I5 is received, respective images are sequentially received without the images being lost. When the I image following the I image I5 is received, the I image I5, the P image P6, a P image not shown, and a P image immediately before the following I image are sequentially decoded through the processing in Step S109. Further, the respective images are sequentially displayed in Step S111.

Figure 13:
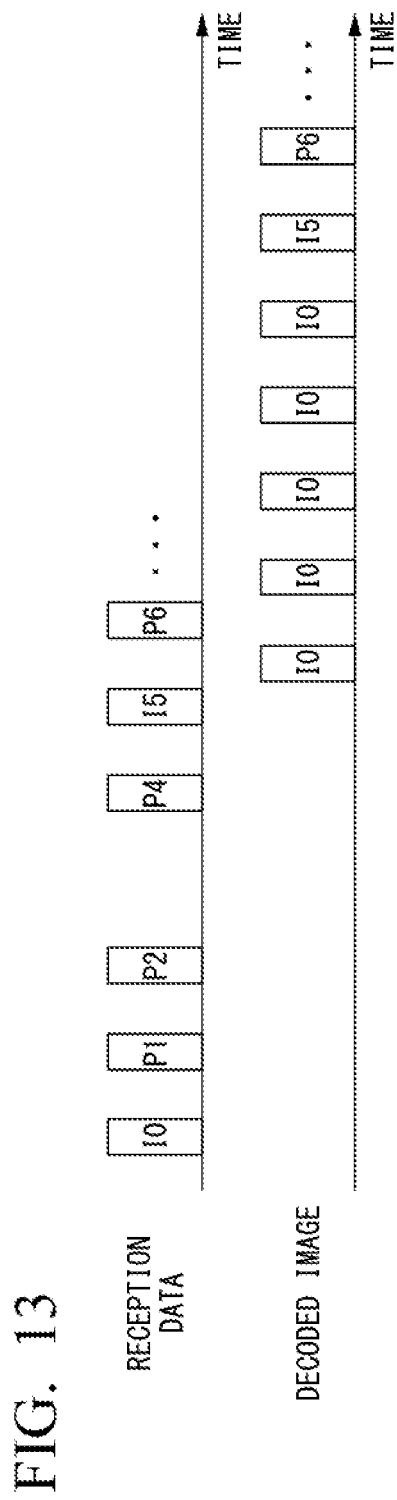
FIG. 13 is a timing chart showing the first operation example in the first embodiment of the present invention.

FIG. 13 shows the time relationship of each image that is based on the operation shown in FIG. 12. The right direction in FIG. 13 represents the direction of the passage of time. In FIG. 13, reception data and a decoded image are shown. The reception data are data received by the image display terminal 101. The decoded image is an image that has been decoded and is displayed by the monitor 131.

The controller 112 causes the decoder 113 to start the decoding in Step S110 due to reception of the I image I5. The controller 112 replaces a non-I image and the lost image out of images from the stored old I image I0 to the P image P4 immediately before the new I image I5 with the stored old I image I0. In other words, the controller 112 replaces the P image P1, the P image P2, the P image P4, and the P image P3 that is the lost image with the I image I0. The controller 112 causes the decoder 113 to sequentially decode the plurality of I images I0. As shown in FIG. 13, the I images I0 are decoded instead of the P images P1 to P4. For this reason, a time period from reception of the old I image I0 to reception of the new I image I5 occurs as the delay between a timing of reception of the I image I0 and a timing of start of the decoding.

Figure 14:
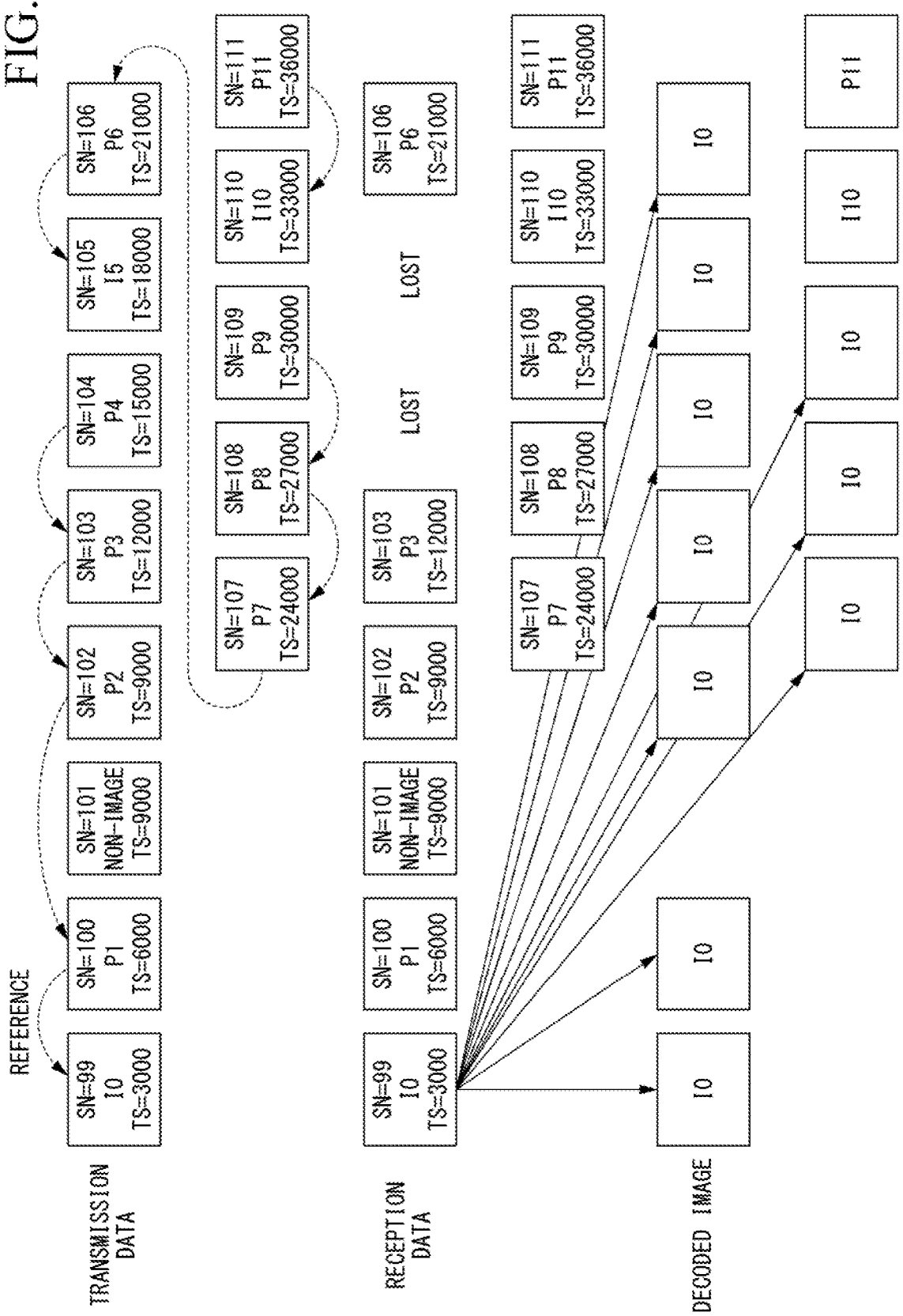
FIG. 14 is a schematic diagram showing a second operation example in the first embodiment of the present invention.

FIG. 14 shows a second operation example in the first embodiment. The right direction in FIG. 14 represents the order of data. In FIG. 14, transmission data, reception data, and a decoded image are shown. The transmission data are data transmitted from the image transmission terminal 201. The reception data are data received by the image display terminal 101. The decoded image is an image that has been decoded and is displayed by the monitor 131. The notation of each piece of data is similar to that in FIG. 12.

Due to constraints of space in the drawing, each piece of data is shown in two layers. For example, the transmission data with SN of 99 to 106 are shown in the upper layer and the transmission data with SN of 107 to 111 are shown in the lower layer. The order of the transmission data and the reception data conforms to the order of SN of each piece of data. The order of the decoded image conforms to the order of SN of the transmission data or the reception data corresponding to the decoded image.

In the second operation example, two consecutive images are lost and loss of the I image occurs. This point is the difference from the first operation example.

The communicator 221 transmits an image and a non-image. The non-image is non-video data such as a parameter of an image. The P image refers to the image immediately before the P image.

The operation until a P image P2 is received and processing regarding the P image P2 is performed is similar to the operation shown in FIG. 12. For this reason, the description regarding the operation will be omitted.

The communicator 121 receives a P image P3 next. Since the P image P3 is the normal image, the P image P3 is stored on the memory 141 in Step S103. At this time, loss of an image has nor occurred. The controller 112 determines the image type of the normal image (P image P3) and determines that the normal image is the P image in Step S105.

The communicator 121 receives a P image P6 next. Since the P image P6 is the normal image, the P image P6 is stored on the memory 141 in Step S103. However, since SN of the P image P3 received before tbc P image P6 is 103 and SN of the P image P6 is 106, loss of the images with SNs of 104 and 105 has occurred. Images of timestamp groups with values of timestamps of 15000 and 18000 have not been received. For this reason, the controller 112 determines that no concluded image is present in these two timestamp groups and the images in these timestamp groups are the lost images in Step S102. The controller 112 stores the positions of the lost images corresponding to TS between 12000 and 21000 in Step S104. The controller 112 determines the image type of the normal image (P image P6) and determines that the normal image is the P image in Step S105.

Thereafter, the communicator 121 sequentially receives a P image P7, a P image P8, and a P image P9. The operation regarding these is similar to the operation regarding the P image P1, the P image P2, and the P image P3. For this reason, the description regarding the operation will be omitted.

The P image P6 directly refers to an I image I5 that is the lost image. The P image P7 directly refers to the P image P6 that directly refers to the I image I5 that is the lost image. For this reason, the P image P7 indirectly refers to the lost image. The P image P8 and the P image P9 also indirectly refer to the lost image.

The communicator 121 receives an I image I10 next. Since the I image I10 is the normal image, the I image I10 is stored on the memory 141 in Step S103. At this time, loss of a new image has not occurred. The controller 112 determines the image type of the normal image (I image I10) and determines that the normal image is the I image in Step S105. At this point, two images, i.e., the I image I0 and the I image I10 are stored as the normal image that is the I image. The positions of the lost images have been stored.

The controller 112 replaces a non-I image and the lost image out of images from the stored old I image I0 to the P image P9 immediately before the new I image I10 with the stored old I image I0 in Step S110. In other words, the controller 112 replaces the P images P1 to P3, the P images P6 to P9, the P image P4 that is the lost image, and the I image I5 that is the lost image with the I image I0. At this time, the controller 112 may rewrite some values of the H.264 header of the I image I0 corresponding to each of the images, lire controller 112 causes the decoder 113 to sequentially decode the plurality of I images I0. As shown in FIG. 14, the I images I0 are decoded instead of the P images P1 to P4, the P images P6 to P9, and the I image I5.

The monitor 131 displays the decoded I images I0 in Step S111 at timings at which the I image I0, the P images P1 to P4, the I image I5, and the P images P6 to P9 are displayed. In other words, the same decoded I images I0 are sequentially displayed at timings at which eight P images and two I images are displayed.

In Step S112, the images from the stored old I image I0 to the P image P9 immediately before the new I image I10 are deleted from the memory 141. In this way, the stored normal image is only the I image I10. In Step S113, the positions of the lost images corresponding to TS between 12000 and 21000 are deleted from the memory 141.

After the I image I10 is received, respective images are sequentially received without the images being lost. When the I image following the I image I10 is received, the I image I10, the P image P11, a P image not shown, and a P image immediately before the following I image are sequentially decoded through the processing in Step S109. Further, the respective images are sequentially displayed in Step S111.

The controller 112 causes the decoder 113 to start the decoding in Step S110 due to reception of the I image I10. The controller 112 replaces a non-I image and the lost image out of images from the stored old I image I0 to the P image P9 immediately before the new I image I10 with the stored old I image I0. In other words, the controller 112 replaces the P images P1 to P3, the P images P6 to P9, the P image P4 that is the lost image, and the I image I5 that is the lost image with the I image I0. The controller 112 causes the decoder 113 to sequentially decode the plurality of I images I0. The I images I0 are decoded instead of the P images P1 to P4, the P images P6 to P9, and the I image I5. For this reason, a time period from reception of the old I image I0 to reception of the new I image I10 occurs as the delay between a timing of reception of the I image I0 and a timing of start of the decoding.

An image display method according to a first aspect of the present invention is based on the operation shown in FIG. 4 and FIG. 5. The image display method according to the first aspect includes first to seventh steps executed by the image display terminal 101.

In a first step (Step S101), an image transmitted from the image transmission terminal 201 in a form of a communication packet including time information and order information is received by the communicator 121, in a second step (Step S102), it is determined whether the image transmitted from the image transmission terminal 201 is the normal image or the lost image on the basis of the time information and the order information. In a third step (Step S105), it is determined whether the image received by the communicator 121 is the reference image or the non-reference image. In a fourth step (Step S109, Step S110, and Step S111), a first image is decoded and the decoded first image is displayed on the monitor 131.

In a fifth step (Step S109, Step S110, and Step S111), a second image is decoded and the decoded second image is displayed on the monitor 131. The first image and the second image are an image that has been determined as the normal image and the non-reference image. A scheduled order in which the first image is displayed on the monitor 131 is before a scheduled order in which the second image is displayed on the monitor 131. When all of one or more third images are the normal images, all the third images are decoded and all the decoded third images are displayed on the monitor 131 in a scheduled order in a sixth step (Step S109 and Step S111). The one or more third images are scheduled to be displayed on the monitor 131 after the first image is displayed and before the second image is displayed. When it is determined that at least one of the third images is the lost image, decoding of all the third images is stopped and the decoded first image is displayed on the monitor 131 instead of each of the third images at a timing at which each of the third images is scheduled to be displayed in a seventh step (Step S110 and Step S111).

The image display method according to the first aspect may not include processing other than processing corresponding to the above-described first to seventh steps.

An image display method according to a second aspect of the present invention is based on the operation shown in FIG. 4, FIG. 5, and FIG. 11. The image display method according to the second aspect includes a first step executed by the image transmission terminal 201 and second to eighth steps executed by the image display terminal 101.

The image transmission terminal 201 transmits an encoded image to the image display terminal 101 in a form of a communication packet including the time information and the order information by using the communicator 221 in a first step. The second to eighth steps are similar to the first to seventh steps in the image display method according to the first aspect.

The image display method according to the second aspect may not include processing other than processing corresponding to the above-described first to eighth steps.

When loss of an image has occurred and an image that should be displayed after the lost image is displayed directly or indirectly refers to the lost image, an image generated by decoding the non-reference image (I image) before the lost image is displayed instead of an image that is before the non-reference image (I image) that is after the lost image. Decoding of the non-reference image does not require calculation of motion compensation in the P image. For this reason, disturbance of display can be suppressed and processing load and power consumption can be reduced.

First Modified Example of First Embodiment

Figure 15:
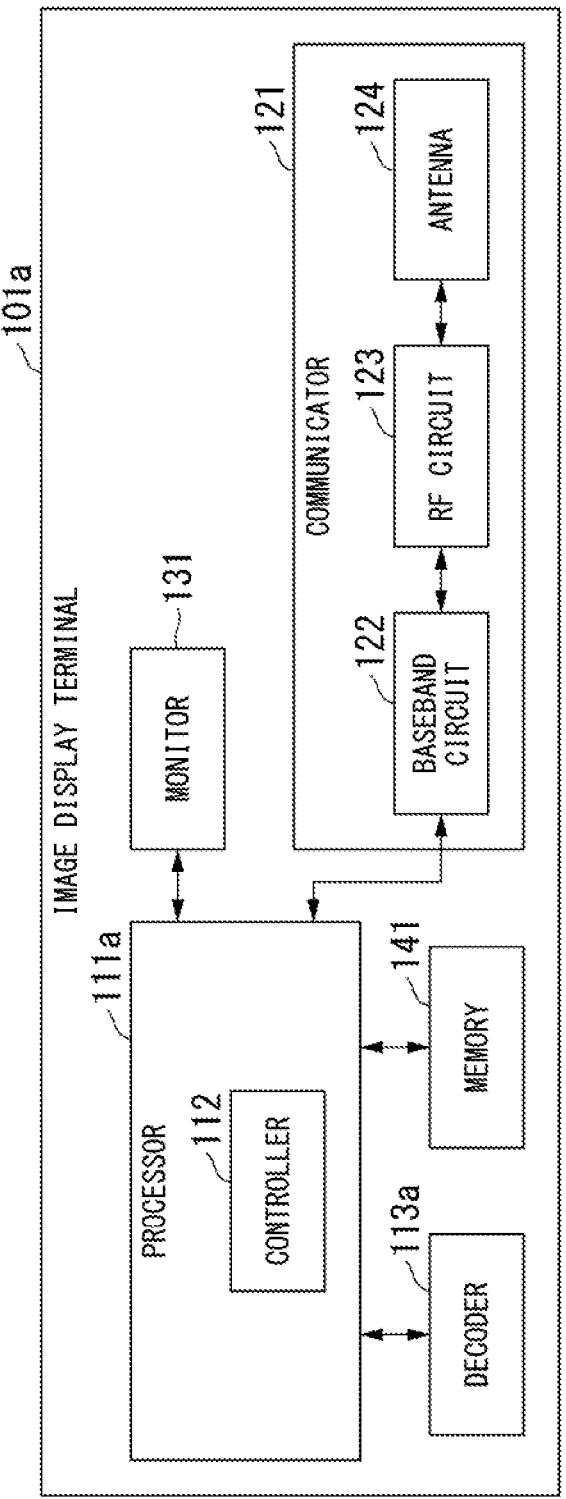
FIG. 15 is a block diagram showing a hardware configuration of an image display terminal according to a first modified example of the first embodiment of the present invention.

FIG. 15 shows a hardware configuration of an image display terminal 101a according to a first modified example of the first embodiment of the present invention. In terms of the configuration shown in FIG. 15, differences from the configuration drown in FIG. 2 will be described.

In the image display terminal 101a, the processor 111 in the image display terminal 101 shown in FIG. 2 is changed to a processor 111a. lire processor 111a does not include the decoder 113 in the processor 111 shown in FIG. 2. The image display terminal 101a includes a decoder 113a. The decoder 113a is constituted by at least one of a dedicated IC, an ASIC, and a FPGA. In terms of points other than the above, the configuration shown in FIG. 15 is similar to the configuration shown in FIG. 2.

Second Modified Example of First Embodiment

Figure 16:
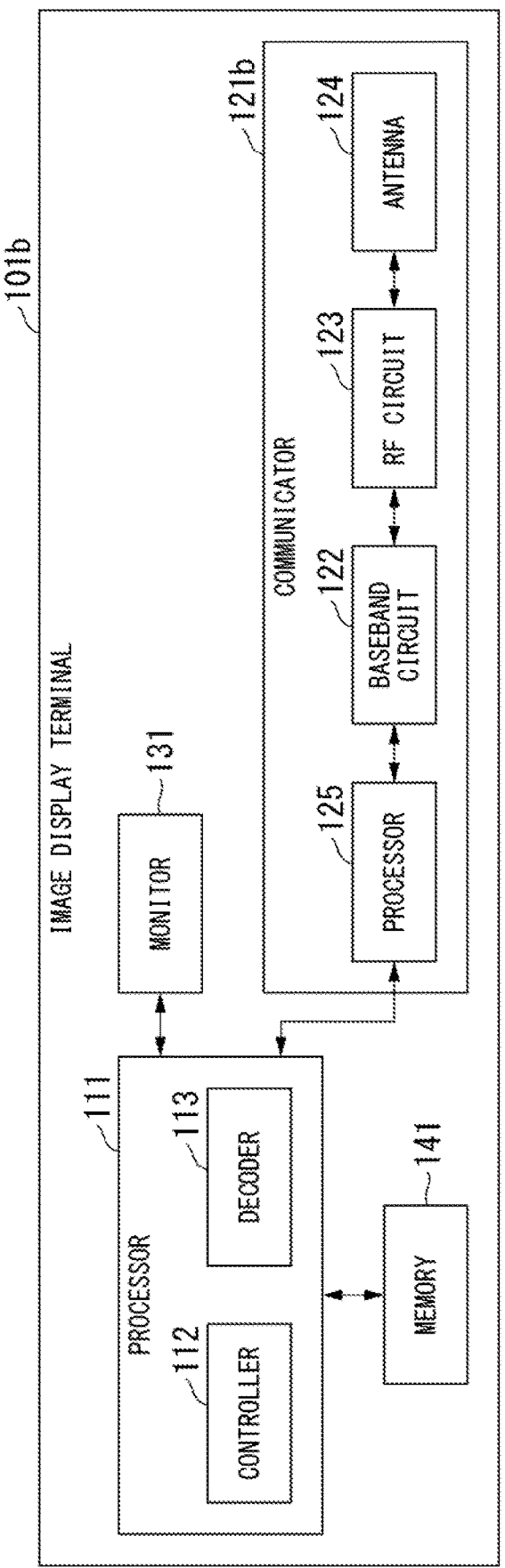
FIG. 16 is a block diagram showing a hardware configuration of an image display terminal according to a second modified example of the first embodiment of the present invention.

FIG. 16 shows a hardware configuration of an image display terminal 101b according to a second modified example of the first embodiment of the present invention. In terms of the configuration shown in FIG. 16, differences from the configuration shown in FIG. 2 will be described.

In the image display terminal 101b, the communicator 121 in the image display terminal 101 shown in FIG. 2 is changed to a communicator 121b. The communicator 121b includes a baseband circuit 122, an RF circuit 123, an antenna 124, and a processor 125. The processor 125 controls the baseband circuit 122. In the communicator 121b, the configuration other than the processor 125 is the same as the configuration in the communicator 121. The processor 111 controls the processor 125. The processor 111 and the processor 125 cooperate with each other in order to control communication performed by the communicator 121b. In terms of points other than the above, the configuration shown in FIG. 16 is similar to the configuration shown in FIG. 2.

The processor 125 may include the decoder 113. In other words, the decoder 113 may function in accordance with a software program operating on the processor 125. In the image display terminal 101b, the processor 111 may be changed to the processor 111a shown in FIG. 15 and the image display terminal 101b may include the decoder 113a shown in FIG. 15. In a case in which the image display terminal 101b includes the decoder 113a, the processor 125 may control the decoder 113a. The memory 141 may be accessed by the processor 125.

Third Modified Example of First Embodiment

Figure 17:
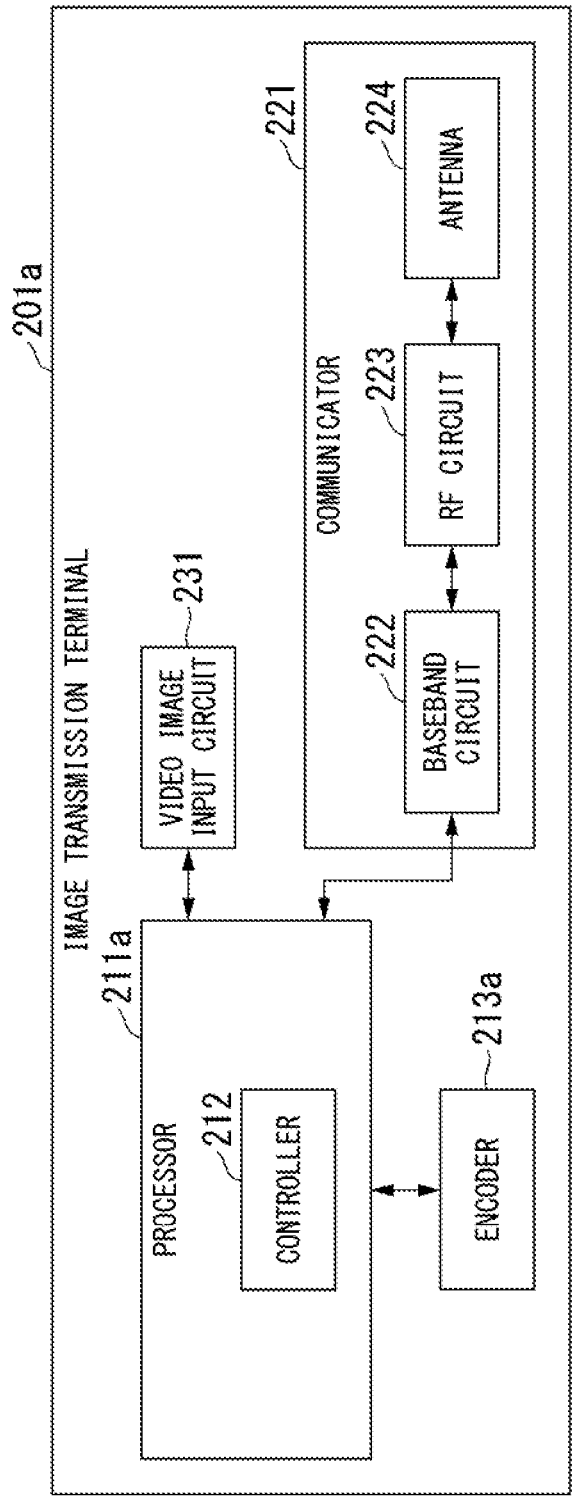
FIG. 17 is a block diagram showing a hardware configuration of an image transmission terminal according to a third modified example of the first embodiment of the present invention.

FIG. 17 shows a hardware configuration of an image transmission terminal 201a according to a third modified example of the first embodiment of the present invention. In terms of the configuration shown in FIG. 17, differences from the configuration shown in FIG. 3 will be described.

In the image transmission terminal 201a, the processor 211 in the image transmission terminal 201 shown in FIG. 3 is changed to a processor 211a. The processor 211a does not include the encoder 213 in the processor 211 shown in FIG. 3. The image transmission terminal 201a includes an encoder 213a. The encoder 213a is constituted by at least one of a dedicated IC, an ASIC, and a FPGA. In terms of points other than the above, the configuration shown in FIG. 17 is similar to the configuration shown in FIG. 3.

Fourth Modified Example of First Embodiment

Figure 18:
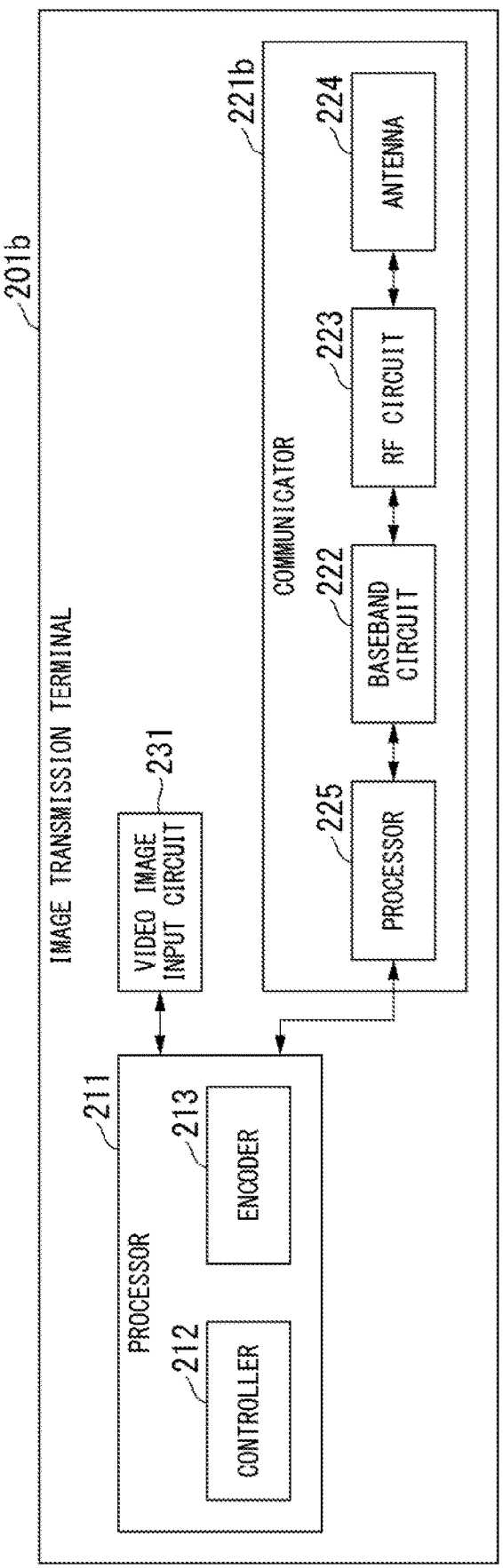
FIG. 18 is a block diagram showing a hardware configuration of an image transmission terminal according to a fourth modified example of the first embodiment of the present invention.

FIG. 18 shows a hardware configuration of an image transmission terminal 201b according to a fourth modified example of the first embodiment of the present invention. In terms of the configuration shown in FIG. 18, differences from the configuration shown in FIG. 3 will be described.

In the image transmission terminal 201b. the communicator 221 in the image transmission terminal 201 shown in FIG. 3 is changed to a communicator 221b. The communicator 221b includes a baseband circuit 222, an RF circuit 223, an antenna 224, and a processor 225. The processor 225 controls the baseband circuit 222. In the communicator 221b, the configuration other than the processor 225 is the same as the configuration in the communicator 221. The processor 211 controls the processor 225. The processor 211 and the processor 225 cooperate with each other in order to control communication performed by the communicator 221b, in terms of points other than the above, the configuration shown in FIG. 18 is similar to the configuration shown in FIG. 3.

The processor 225 may include the encoder 213. In other words, the encoder 213 may function in accordance with a software program operating on the processor 225. In the image transmission terminal 201b. the processor 211 may be changed to the processor 211a shown in FIG. 17 and the image transmission terminal 201b may include the encoder 213a shown in FIG. 17. In a case in winch the image transmission terminal 201b includes the encoder 213a, the processor 225 may control the encoder 213a.

Second Embodiment

A second embodiment of the present invention will be described by using the image display terminal 101 shown in FIG. 2 and the image transmission terminal 201 shown in FIG. 3.

In the first embodiment, images including the lost image are replaced with the old I image and the I image is sequentially decoded instead of the respective images On the other hand, in the second embodiment, images including the lost image are replaced with data for displaying a result of decoding the old I image.

The memory 141 stores a decoded first image used when the first image was displayed. When it is determined that at least one of third images is the lost image, the monitor 131 displays the first image stored on the memory 141 instead of each of the third images at a timing at which each of the third images is scheduled to be displayed. The first image and the second image are an image that has been determined as the normal image and the non-reference image. The at least one of third images is scheduled to be displayed on the monitor 131 after the first image is displayed and before the second image is displayed.

Figure 19:
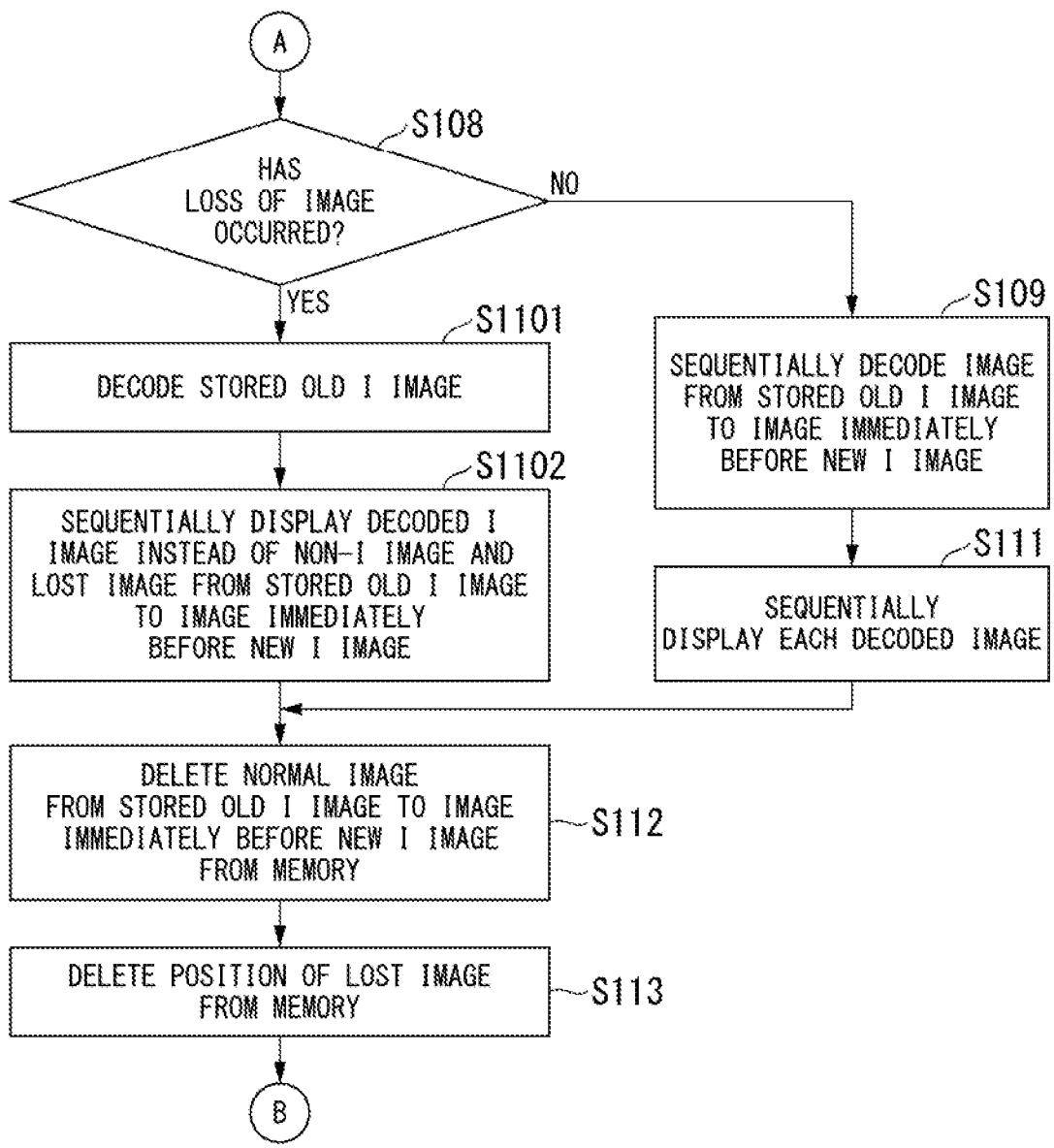
FIG. 19 is a flow chart showing a procedure of an operation of an image display terminal according to a second embodiment of the present invention.

The processing shown in FIG. 5 in the first embodiment is changed to the processing shown in FIG. 19. The processing shown in FIG. 4 is common with the first and second embodiments. In terms of the processing shown in FIG. 19, differences from the processing shown in FIG. 5 will be described. The processing in Step S110 shown in FIG. 5 is changed to the processing in Step S1101 and Step S1102.

(Step S1101)

When the position of the lost image is stored on the memory 141, the controller 112 causes the decoder 113 to decode the old I image stored on the memory 141. The decoded old I image is stored on the memory 141.

(Step S1102)

The controller 112 replaces all of the images that are not the I images and the lost image out of images from the stored old I image to the image immediately before the following new I image with data for display generated through the decoding in Step S1101, in other words, the controller 112 replaces the respective images with the decoded old I image. The controller 112 causes the monitor 131 to sequentially display the decoded old I image. In this way, the monitor 131 sequentially displays the old I image decoded by the decoder 113.

When three or more normal images that are the I images are stored, the controller 112 may replace images from the oldest I image to the image immediately before the newest I image with the decoded old I image and may cause the monitor 131 to display the decoded old I image. Specifically, when at least one of images after the oldest I image and before the newest I image is the lost image, the controller 112 performs the above-described replacement and causes the monitor 131 to display the decoded image. When none of the images after the oldest I image and before the newest I image are the lost images, the controller 112 causes the decoder 113 to sequentially decode each of the images through the method in Step S109 and causes the monitor 131 to display the decoded image through the method in Step S111.

When three or more normal images that are the I images are stored, the controller 112 may replace images from the oldest I image to the image immediately before the I image two or more images newer than the oldest I image in chronological order with the decoded old I image and may cause the monitor 131 to display the decoded old I image. Specifically, when at least one of images after the oldest I image and before the I image two or more images newer than the oldest I image is the lost image, the controller 112 performs the above-described replacement and causes the monitor 131 to display the decoded image. When none of the images after the oldest I image and before the I image two or more images newer than the oldest I image are the lost images, the controller 112 causes the decoder 113 to sequentially decode each of the images through the method in Step S109 and causes the monitor 131 to display the decoded image through the method in Step S111.

In terms of points other than the above, the processing drown in FIG. 19 is similar to the processing shown in FIG. 5.

Figure 20:
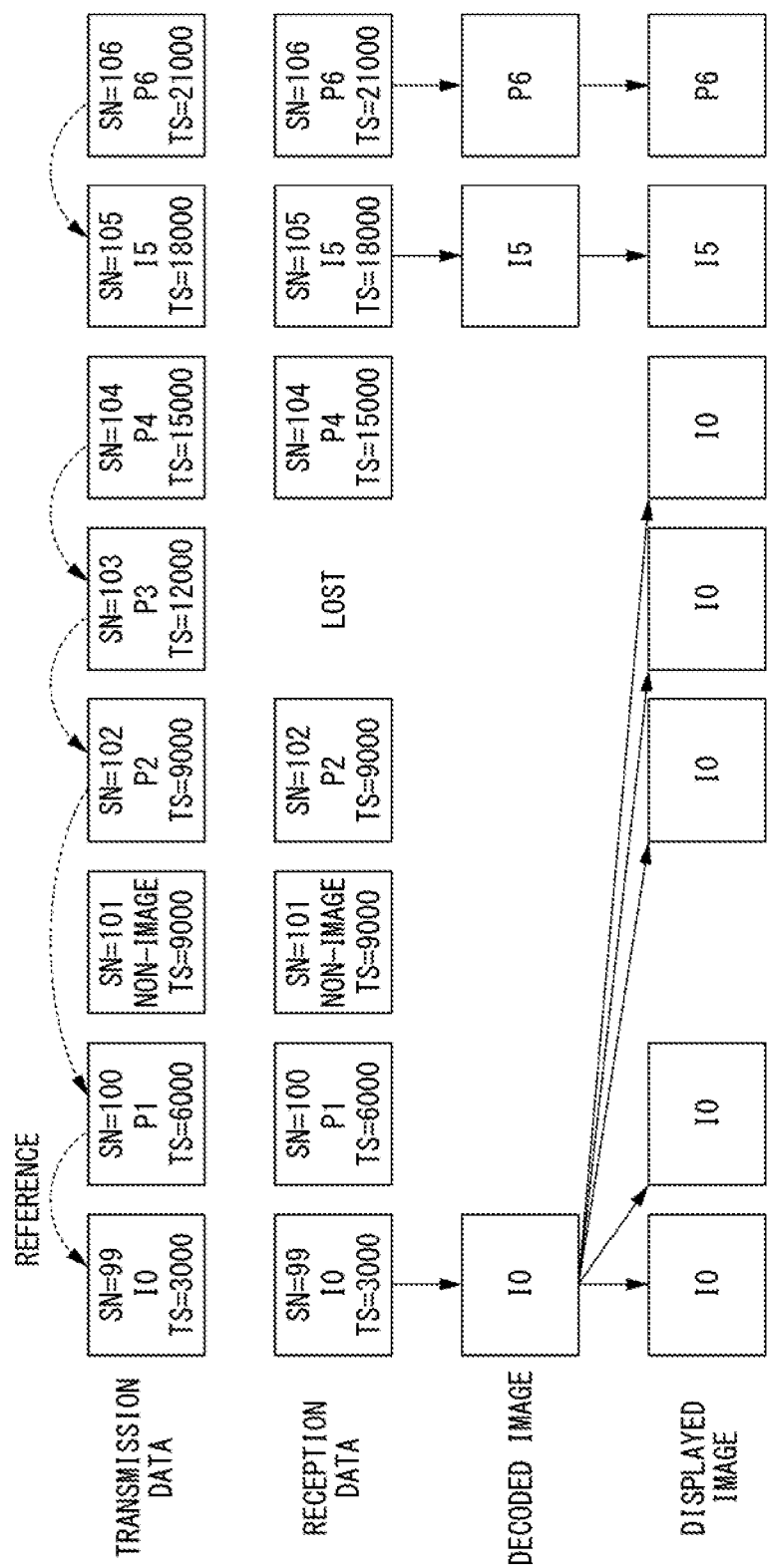
FIG. 20 is a schematic diagram showing an operation example in the second embodiment of the present invention.

FIG. 20 shows an operation example in the second embodiment. The right direction in FIG. 20 represents the order of data. In FIG. 20, transmission data, reception data, a decoded image, and a displayed image are shown. The transmission data are data transmitted from the image transmission terminal 201. The reception data are data received by the image display terminal 101. The decoded image is an image that has been decoded and is displayed by the monitor 131. The displayed image is all image that has been displayed by the monitor 131. The notation of each piece of data is similar to that in FIG. 12.

The communicator 221 transmits an image and a non-image. The non-image is non-video data such as a parameter of au image. The P image refers to the image immediately before the P image.

The operation until a P image P4 is received and processing regarding the P image P4 is performed is similar to the operation shown in FIG. 12. For this reason, the description regarding the operation will be omitted.

The communicator 121 receives au I image I5 next. Since the I image I5 is the normal image, the I image I5 is stored on the memory 141 in Step S103. At this time, loss of a new image has not occurred. The controller 112 determines the image type of the normal image (I image I5) and determines that the normal image is the I image in Step S105. At this point, two images, i.e., the I image I0 and the I image I5 are stored as the normal image that is the I image. The position of the lost image has been stored.

The controller 112 causes the decoder 113 to decode the stored old I image I0 in Step S1101. The controller 112 replaces a non-I image and the lost image out of images from the stored old I image I0 to the P image P4 immediately before the new I image I5 with the decoded old I image I0 in Step S1102. In other words, the controller 112 replaces the P image P1, the P image P2, the P linage P4, and the P image P3 that is the lost image with the decoded I image I0.

The monitor 131 displays the decoded I images I0 in Step S1102 at timings at which the I image I0 and the P images P1 to P4 are displayed. In other words, the same decoded I images I0 are sequentially displayed at timings at which four P images and one I image are displayed. As shown in FIG. 20, the decoded I images I0 are displayed instead of the P images P1 to P4.

In Step S112, the images from the stored old I image I0 to the P image P4 immediately before the new I image I5 are deleted from the memory 141. In this way, the stored normal image is only the I image I5. In Step S113, the position of the lost image corresponding to TS between 9000 and 15000 is deleted from the memory 141.

After the I image I5 is received, respective images are sequentially received without the images being lost. When the I image following the I image I5 is received, the I image I5, the P image P6, a P image not shown, and a P image immediately before the following I image are sequentially decoded through the processing in Step S109. Further, the respective images are sequentially displayed in Step S111.

Figure 21:
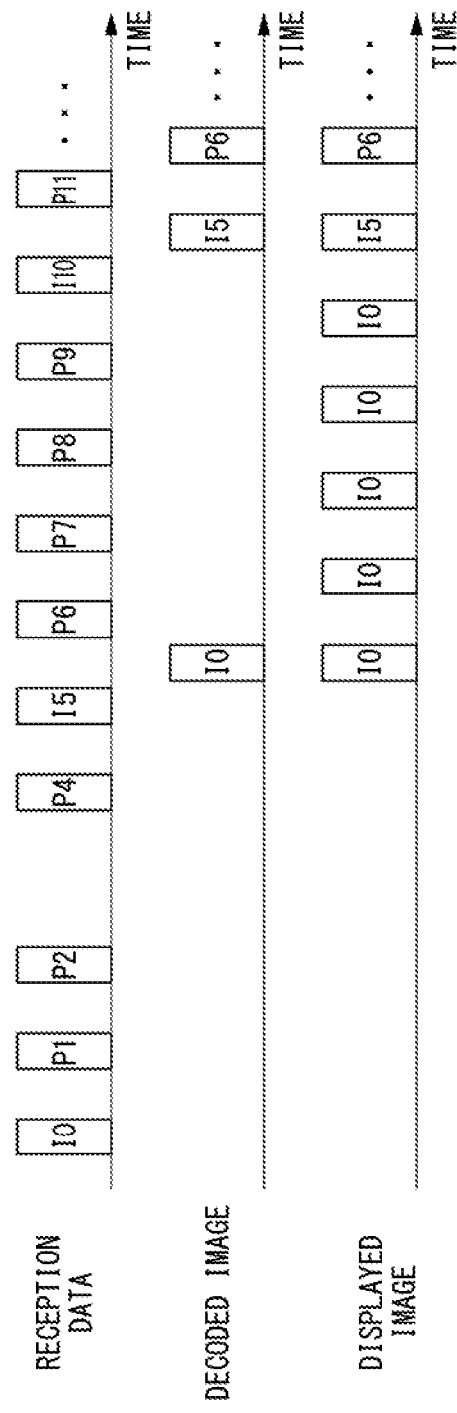
FIG. 21 is a timing chart showing the operation example in the second embodiment of the present invention.

FIG. 21 shows the time relationship of each image that is based on the operation shown in FIG. 20. The right direction in FIG. 21 represents the direction of the passage of time, in FIG. 21, reception data, a decoded image, and a displayed image are shown. The reception data are data received by the image display terminal 101. The decoded image is an image that has been decoded and is displayed by the monitor 131. The displayed image is an image that has been displayed by the monitor 131.

The controller 112 causes the decoder 113 to start the decoding in Step S1101 due to reception of the I image I5. The decoder 113 decodes the I image I0 only once. The controller 112 replaces a non-I image and the lost image out of images from the stored old I image I0 to the P image P4 immediately before the new I image I5 with the decoded old I image I0. In other words, the controller 112 replaces the P image P1, the P image P2, the P image P4, and the P image P3 that is the lost image with the decoded I image I0. The controller 112 causes the monitor 131 to sequentially display the decoded I image I0. For this reason, a time period from reception of the old I image I0 to reception of the new I image I5 occurs as the delay between a timing of reception of the I image I0 and a timing of decoding and displaying.

In the second embodiment, the image display terminal 101a shown in FIG. 15 or the image display terminal 101b shown in FIG. 16 may be used, in the second embodiment, the image transmission terminal 201a shown in FIG. 17 or the image transmission terminal 201b shown in FIG. 18 may be used.

When loss of an image has occurred and an image that should be displayed after the lost image is displayed directly or indirectly refers to the lost image, all image generated by decoding the non-reference image (I image) before the lost image is displayed instead of an image that is before the non-reference image (I image) that is after the lost image. The number of times of decoding processing of the non-reference image displayed instead of respective images is reduced. For this reason, disturbance of display can be suppressed and processing load and power consumption can be more effectively reduced.

Third Embodiment

A third embodiment of the present invention will be described by using the image display terminal 101 shown in FIG. 2 and the image transmission terminal 201 shown in FIG. 3.

In the third embodiment, the communicator 221 transmits an encoded image to the image display terminal 101 in a form of a communication packet including the time information and the order information. The communicator 221 receives lost image information from the image display terminal 101. The lost image information represents occurrence of loss of an image. The lost image information is transmitted from the image display terminal 101 when it is determined in the image display terminal 101 that at least one of third images is the lost image. The third images are one or more images that are scheduled to be displayed on the monitor 131 of the image display terminal 101 after a first image is displayed and before a second image is displayed, lire first image and the second image are an image that has been determined as the normal image and the non-reference image. A scheduled order in which the first image is displayed on the monitor 131 is before a scheduled order in which the second image is displayed on the monitor 131. When the lost image information is received, the communicator 221 stops transmission of the reference image until the non-reference image is transmitted to the image display terminal 101. When it is determined that at least one of the third images is the lost image, the communicator 121 transmits the lost image information to the image transmission terminal 201.

Figure 22:
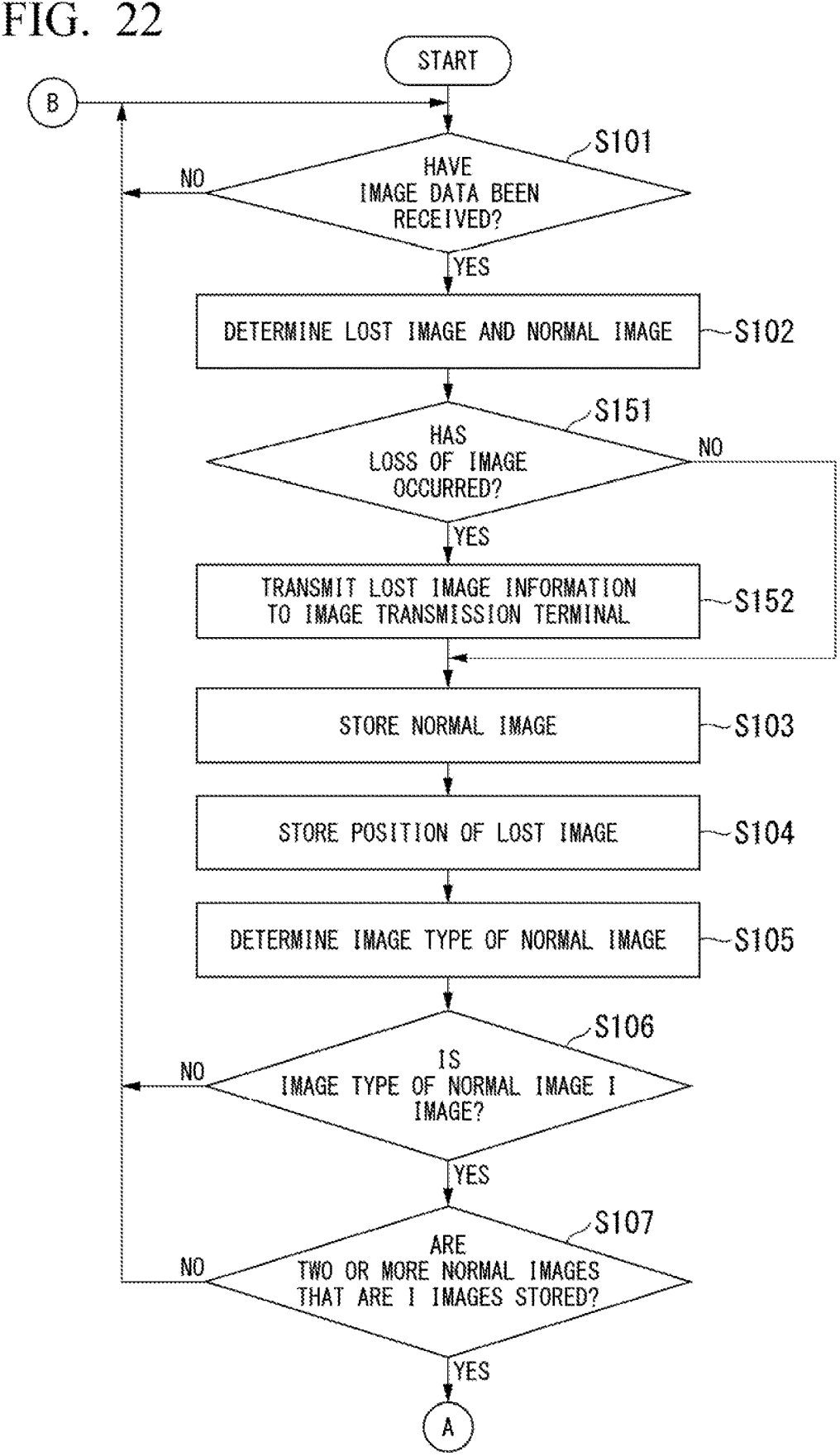
FIG. 22 is a flow chart showing a procedure of all operation of an image display terminal according to a third embodiment of the present invention.

The processing shown in FIG. 4 in the first embodiment is changed to the processing shown in FIG. 22. Dre processing shown in FIG. 5 is common with the first and third embodiments. In terms of the processing shown in FIG. 22, differences from the processing shown in FIG. 4 will be described. The processing in Step S151 and Step S152 is added.

(Step S151)

The controller 112 determines whether or not loss of an image has occurred on the basis of a result of the determination in Step S102. When loss of an image has not occurred, the processing in Step S103 is executed. When loss of an image has occurred the processing in Step S152 is executed.

(Step S152)

The controller 112 generates the lost image information and transmits the lost image information to the image transmission terminal 201 by using the communicator 121. After Step S152, the processing in Step S103 is executed.

After the lost image information is transmitted to the image transmission terminal 201, the controller 112 may cause the communicator 121 to stop transmission of the lost image information until the non-reference image is received next from the image transmission terminal 201, regardless of whether or not loss of an image occurs. In this way, the communicator 121 stops transmission of the lost image information. In a case in which loss of an image has occurred after the non-reference image is received next from the image transmission terminal 201, the lost image information is transmitted to the image transmission terminal 201 in Step S152.

In a case in which it is determined that loss of an image temporally before the non-reference image has occurred immediately after the non-reference image is received from the image transmission terminal 201, the controller 112 may cause the communicator 121 to stop transmission of the lost image information. For example, in a case in which it is determined that loss of an image temporally before the non-reference image has occurred after the non-reference image is received from the image transmission terminal 201 and before the following image is received from the image transmission terminal 201, the controller 112 causes the communicator 121 to stop transmission of the lost image information. In this way, the communicator 121 stops transmission of the lost image information. In a case in which loss of an image has occurred after transmission of the lost image information is stopped, the lost image information is transmitted to the image transmission terminal 201 in Step S152.

In terms of points other than the above, the processing shown in FIG. 22 is similar to the processing shown in FIG. 4.

Figure 23:
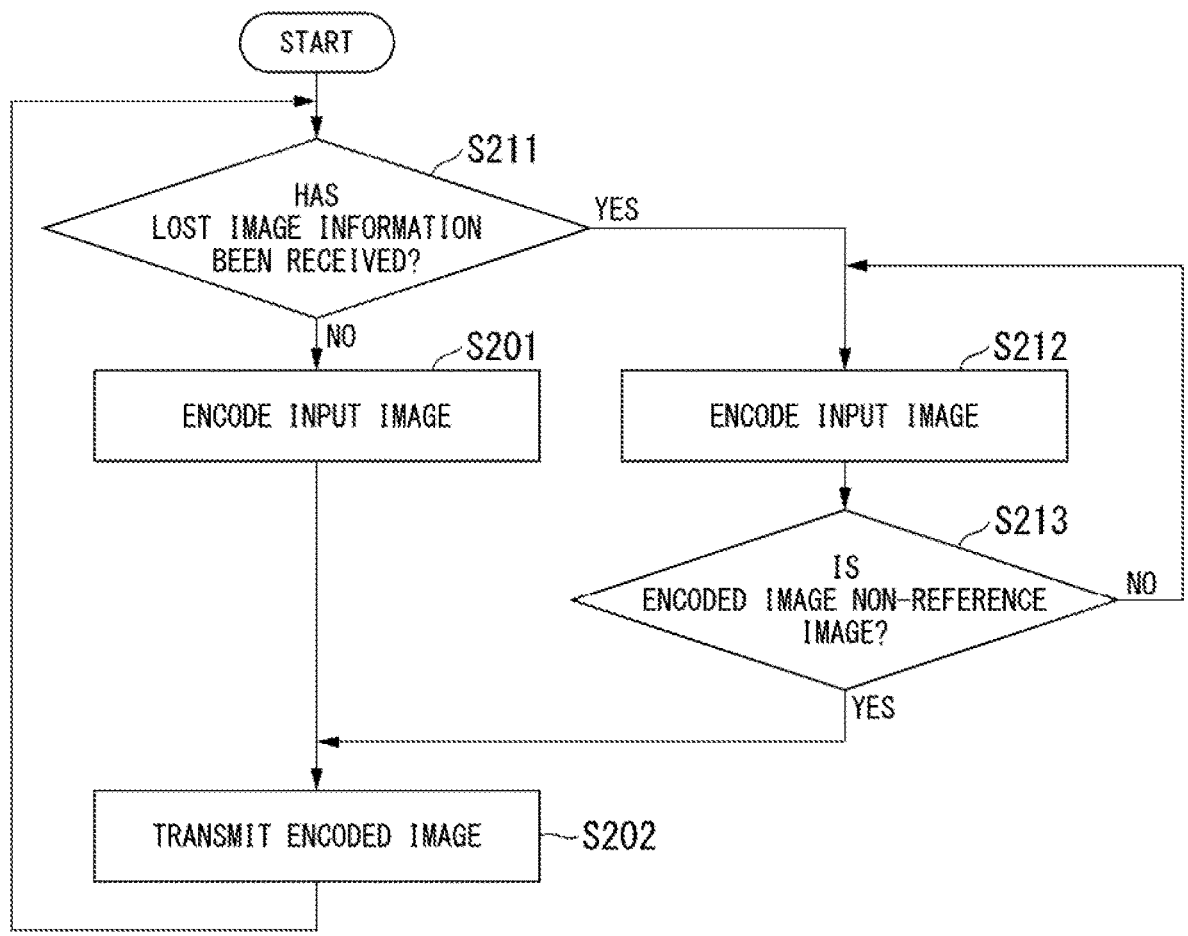
FIG. 23 is a flow chart showing a procedure of an operation of an image transmission terminal according to the third embodiment of the present invention.

The processing shown in FIG. 11 in the first embodiment is changed to the processing shown in FIG. 23. In terms of the processing shown in FIG. 23, differences from the processing shown in FIG. 11 will be described. The processing in Steps S211 to S213 is added.

(Step S211)

When the lost image information is transmitted from the image display terminal 101, the communicator 221 receives the lost image information. The controller 212 monitors the communicator 221 and determines whether or not the lost image information has been received. When the lost image information has not been received, the processing in Step S201 is executed. When the lost image information has been received, the processing in Step S212 is executed.

After it is determined that the lost image information has been received, it is determined that the lost image information has been received in Step S211 until the non-reference image is transmitted to the image display terminal 101 next. After the non-reference image is transmitted to the image display terminal 101 next, it is determined that the lost image information has not been received in Step S211 until the lost image information is received from the image display terminal 101 next, in other words, after the non-reference image is transmitted to the image display terminal 101 next, transmission of the reference image is resumed.

In a case in which the lost image information is received from the image display terminal 101 immediately after the non-reference image is transmitted to the image display terminal 101, the controller 212 may disregard the lost image information. For example, in a case the lost image information is received from the image display terminal 101 after the non-reference image is transmitted to the image display terminal 101 and before the following image is transmitted, the controller 212 disregards the lost image information.

(Step S212)

The encoder 213 encodes an image input from the video image input circuit 231 to the processor 211.

(Step S213)

The controller 212 determines whether or not the image encoded in Step S212 is the non-reference image. This determination is performed similarly to the determination in Step S105. As a result of the determination, when the image encoded in Step S212 is not the non-reference image, the processing in Step S212 is executed. In this way, transmission of the reference image, i.e., the P image is stopped. As a result of the determination, when the image encoded in Step S212 is the non-reference image, the processing in Step S202 is executed, in this way, the non-reference image, i.e., the I image is transmitted to the image display terminal 101. After Step S202, the processing in Step S211 is executed.

In terms of points other than the above, the processing shown in FIG. 23 is similar to the processing shown in FIG. 11.

Figure 24:
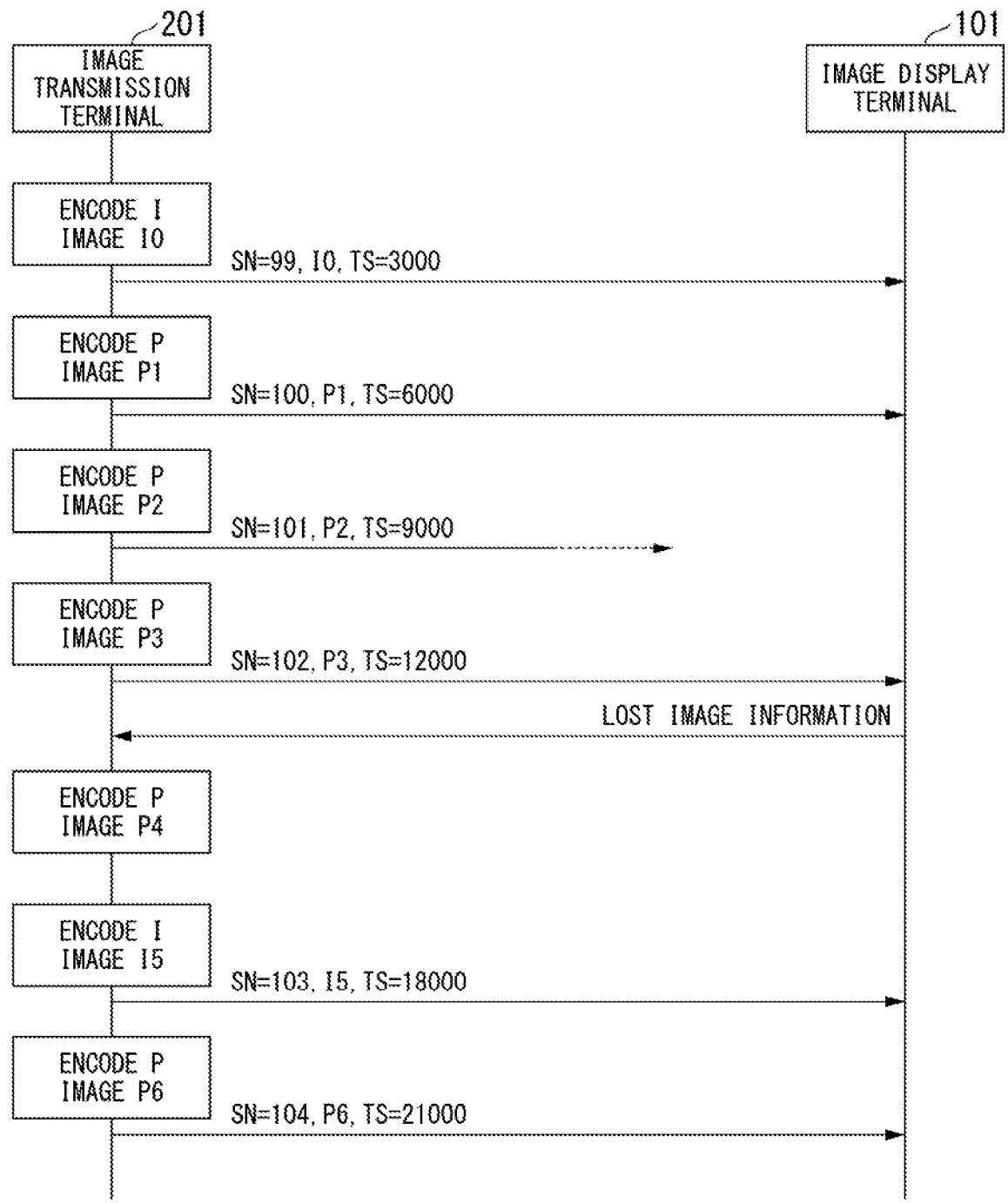
FIG. 24 is a sequence diagram showing communication performed by the image display terminal and the image transmission terminal according to the third embodiment of the present invention.

FIG. 24 shows communication performed by the image display terminal 101 and the image transmission terminal 201. The image transmission terminal 201 transmits a video image and a non-video image, but transmission of the non-video image is not shown in FIG. 24.

The image transmission terminal 201 sequentially encodes an I image I0, a P image P1, a P image P2, and a P image P3 and transmits the encoded images to the image display terminal 101. During this operation, the image transmission terminal 201 does not receive the lost image information.

The image display terminal 101 receives the I image I0 first. The I image I0 is the normal image and loss of an image has not occurred. The image display terminal 101 decodes the I image I0 and displays the decoded I image I0. The image display terminal 101 receives the P image P1 next. The P image P1 is the normal image and loss of an image has not occurred. The image display terminal 101 decodes the P image P1 and displays the decoded P image P1.

The image display terminal 101 receives the P image P3 next. Since SN of the P image P1 received before the P image P3 is 100 and SN of the P image P3 is 102, loss of the image with SN of 101 has occurred. An image of a timestamp group with a value of a timestamp of 9000 has not been received. For this reason, the controller 112 determines that no concluded image is present in this timestamp group and the image in this timestamp group is the lost image in Step S102. For this reason, the controller 112 transmits the lost image information to the image transmission terminal 201 by using the communicator 121 in Step S152.

After the P image P3 is Transmitted the image transmission terminal 201 receives the lost image information from the image display terminal 101. The controller 212 causes the encoder 213 to encode the P image P4 in Step S212. Since the P image P4 is the reference image, the P image P4 is nor transmitted to the image display terminal 101.

Next, the controller 212 causes the encoder 213 to encode the I image I5 in Step S212. Since the I image I5 is the non-reference image, the image transmission terminal 201 transmits the I image I5 to the image display terminal 101.

The image display terminal 101 receives the I image I5. The I image I5 is the normal image and loss of a new image has not occurred. At this point, two images, i.e., the I image I0 and the I image I5 are stored as the normal image that is the I image. Since the position of the lost image has been stored, the image display terminal 101 displays the decoded I image I0 instead of the P image P1, the P image P2, the P image P4, and the P image P3 that is the lost image.

Next, the image transmission terminal 201 encodes a P image P6 and transmits the encoded P image P6 to the image display terminal 101. The image display terminal 101 receives the P image P6. The P image P6 is the normal image and loss of an image has not occurred. The image display terminal 101 decodes the P image P6 and displays the decoded P image P6.

Thereafter, as long as a loss of an image does not occur, the image transmission terminal 201 sequentially encodes images and transmits the encoded images to the image display terminal 101. The image display terminal 101 sequentially decodes received images and displays the decoded images.

An image transmission method according to each aspect of the present invention is based on the operation shown in FIG. 23. The image transmission method includes first to third steps executed by the image transmission terminal 201.

In a first step (Step S202), an image is transmitted to the image display terminal 101 in a form of a communication packet including the time information and the order information by using the communicator 221. In a second step (Step S211), the lost image information is received from the image display terminal 101 by using the communicator 221. When the lost image information is received, transmission of the reference image is stopped in a third step (Step S213) until the non-reference image is transmitted to the image display terminal 101.

The image transmission method according to each aspect of the present invention may not include processing other than processing corresponding to the above-described first to third steps.

In the third embodiment, the image display terminal 101a shown in FIG. 15 or the image display terminal 101b shown in FIG. 16 may be used. In the third embodiment, the image transmission terminal 201a shown in FIG. 17 or the image transmission terminal 201b shown in FIG. 18 may be used. In the third embodiment, the processing shown in FIG. 19 may be executed instead of the processing shown in FIG. 5.

When loss of an image has occurred, the image display terminal 101 transmits the lost image information to the image transmission terminal 201. The image transmission terminal 201 stops transmission of the reference image (F image) until the next non-reference image (I image) is generated. The image display terminal 101 does not receive the reference image until the new non-reference image is received For this reason, disturbance of display can be suppressed and processing load and power consumption can be more effectively reduced.

Other Modified examples of First to Third Embodiments

In the first to third embodiments, the determination regarding the reference image and the non-reference image is performed on the basis of a value of the slice_type included in the slice header of H.264. The controller 112 may analyze a data portion of H.264 of received image data and determine whether or not each of the motion compensation blocks refers to another image. If no motion compensation block that refers to another image is present in one image, the controller 112 may determine that an image is the non-reference image. If one or more motion compensation blocks that refer to another image are present, the controller 112 may determine that an image is the reference image.

In the first to third embodiments, examples are described on the basis of the assumption that au image included m a video image transmitted from the image transmission terminal 201 includes only one slice. The number of slices in one image may be fixed and one image may include a plurality of slices. In this case, the processing in Step S102 is executed as follows.

The controller 112 determines whether or not a normal slice is present on the basis of a timestamp and a value of SN of au RTP packet that has been received. When a value of SN is consecutive from the value of SN of the RTP packet that has been received and a concluded slice is present in a timestamp group, the controller 112 determines that the normal slice is present. The concluded slice is a slice in which image data are not lost and all of the data are present.

The controller 112 determines whether or not a slice is the concluded slice as follows. When an RTP packet including a target slice for determination is the single packet and a value of the Type field within the RTP packet represents image data of H.264 in Table 7-1 of H.264. a slice included in the RTP packet is the concluded slice.

When an RTP packet including a target slice for determination is the aggregated packet and a value of the Type field in the head byte in each NALU within the RTP packet represents image data in Table 7-1 of H.264, a slice included in the RTP packet is the concluded slice.

When a value of the S bit of FU Header within each divided packet is 1, the divided packet corresponds to the head (Start) of divided image data. When a value of the E bit of FU Header within each divided packet is 1, the divided packet corresponds to the end (End) of divided image data. When a target packet for determination is the divided packet, the determination is performed as follows. When there are the divided packet with the S bit of 1 and the divided packet with the E bit of 1 in the same timestamp group and no SN is lost between the two divided packets and Type in FU Header represents image data in Table 7-1 of H.264, a slice included in each divided packet is the concluded slice.

When the number of the concluded slice in a certain timestamp group is the same as the number of slices in one image, an image is the normal image. Values of timestamps of slices in one image may be different from each other. A value of a timestamp of each of the slices falls within a range of one timestamp group. The timestamp group does not overlap a timestamp group of the preceding image or the next image. When the number of the concluded slice in a certain timestamp group is different from the number of slices in one image, an image is the lost image.

The processing in Step S105 is executed as follows. When values of the slice type of all the slices in one image are any one of 2 and 7, the image is the I image, i.e., the non-reference image. On the other hand, when a value of the slice_type of at least one slice is any one of 0 and 5, the image is the P image, i.e., the reference image.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image display terminal comprising:
a communicator;
a monitor;
a decoder;
a controller; and
a memory,
wherein the communicator is configured to receive an image transmitted from an image transmission terminal in a form of a communication packet including time information, order information of the communication packet, image data information that represents whether or not data of the communication packet is the image, and storage information that represents whether the image is stored in a single packet, an aggregated packet, or a divided packet, the image being any one of a reference image and a non-reference image, the reference image being an image that refers to another image that temporally precedes the reference image, the non-reference image being an image that does not refer to the another image,
the memory is configured to store the image received by the communicator or the image received by the communicator and decoded,
the controller is configured to determine whether the image transmitted from the image transmission terminal is a normal image or a lost image on the basis of the time information, the order information, the image data information, and the storage information, the normal image being an image transmitted from the image transmission terminal and received by the communicator without being lost, at least part of the lost image being lost,
the controller is configured to determine whether the image received by the communicator is the reference image or the non-reference image,
the decoder is configured to decode a first image and the monitor is configured to display the decoded first image,
the decoder is configured to decode a second image and the monitor is configured to display the decoded second image, the first image and the second image being an image that has been determined as the normal image and the non-reference image, a scheduled order in which the first image is displayed on the monitor being before a scheduled order in which the second image is displayed on the monitor,
the decoder is configured to decode all of one or more third images and the monitor is configured to display all the decoded third images in a scheduled order when it is determined that all the third images are the normal image, the one or more third images being scheduled to be displayed on the monitor after the first image is displayed and before the second image is displayed, and
the decoder is configured to replace all the third images with the first image and decode the first image and the monitor is configured to display the decoded first image instead of each of the third images at a timing at which each of the third images is scheduled to be displayed when it is determined that at least one of the third images is the lost image.

2. The image display terminal according to claim 1, wherein the communication packet includes header information to which a slice type is attached, the slice type represents whether or not the image transmitted in the form of the communication packet refers to another image, and
the controller is configured to determine whether the image received by the communicator is the reference image or the non-reference image on the basis of the slice type.

3. An image display system comprising:
an image transmission terminal; and
an image display terminal,
wherein the image transmission terminal includes a first communicator configured to transmit an encoded image to the image display terminal in a form of a communication packet including time information, order information of the communication packet, image data information that represents whether or not data of the communication packet is the image, and storage information that represents whether the image is stored in a single packet, an aggregated packet, or a divided packet, the image being any one of a reference image and a non-reference image, the reference image being an image that refers to another image that temporally precedes the reference image, the non-reference image being an image that does not refer to the another image,
the image display terminal includes
a second communicator,
a monitor,
a decoder,
a controller, and
a memory,
the second communicator is configured to receive the image transmitted from the image transmission terminal,
the memory is configured to store the image received by the second communicator or the image received by the second communicator and decoded,
the controller is configured to determine whether the image received by the second communicator is a normal image or a lost image on the basis of the time information, the order information, the image data information, and the storage information, the normal image being an image transmitted from the image transmission terminal and received by the second communicator without being lost, at least part of the lost image being lost,
the controller is configured to determine whether the image received by the second communicator is the reference image or the non-reference image,
the decoder is configured to decode a first image and the monitor is configured to display the decoded first image,
the decoder is configured to decode a second image and the monitor is configured to display the decoded second image, the first image and the second image being an image that has been determined as the normal image and the non-reference image, a scheduled order in which the first image is displayed on the monitor being before a scheduled order in which the second image is displayed on the monitor,
the decoder is configured to decode all of one or more third images and the monitor is configured to display all the decoded third images in a scheduled order when it is determined that all the third images are the normal image, the one or more third images being scheduled to be displayed on the monitor after the first image is displayed and before the second image is displayed, and the decoder is configured to replace all the third images with the first image and decode the first image and the monitor is configured to display the decoded first image instead of each of the third images at a timing at which each of the third images is scheduled to be displayed when it is determined that at least one of the third images is the lost image.

4. The image display system according to claim 3,
wherein the second communicator is configured to transmit lost image information to the image transmission terminal when it is determined that at least one of the third images is the lost image,
the first communicator is configured to receive the lost image information from the image display terminal, and
the first communicator is configured to stop transmission of the reference image until the non-reference image is transmitted to the image display terminal when the lost image information is received.

5. An image display method comprising:
a first step of causing a communicator to receive an image transmitted from an image transmission terminal in a form of a communication packet including time information, order information of the communication packet, image data information that represents whether or not data of the communication packet is the image, and storage information that represents whether the image is stored in a single packet, an aggregated packet, or a divided packet, the image being any one of a reference image and a non-reference image, the reference image being an image that refers to another image that temporally precedes the reference image, the non-reference image being an image that does not refer to the another image;
a second step of causing a controller to determine whether the image transmitted from the image transmission terminal is a normal image or a lost image on the basis of the time information, the order information, the image data information, and the storage information, the normal image being an image transmitted from the image transmission terminal and received by the communicator without being lost, at least part of the lost image being lost;
a third step of causing the controller to determine whether the image received by the communicator is the reference image or the non-reference image;
a fourth step of causing a decoder to decode a first image and causing a monitor to display the decoded first image;
a fifth step of causing the decoder to decode a second image and causing the monitor to display the decoded second image, the first image and the second image being an image that has been determined as the normal image and the non-reference image, a scheduled order in which the first image is displayed on the monitor being before a scheduled order in which the second image is displayed on the monitor;
a sixth step of causing the decoder to decode all of one or more third images and causing the monitor to display all the decoded third images in a scheduled order when it is determined that all the third images are the normal image, the one or more third images being scheduled to be displayed on the monitor after the first image is displayed and before the second image is displayed; and
a seventh step of causing the decoder to replace all the third images with the first image and decode the first image and causing the monitor to display the decoded first image instead of each of the third images at a timing at which each of the third images is scheduled to be displayed when it is determined that at least one of the third images is the lost image.

6. An image display method comprising:
a first step of causing an image transmission terminal to transmit an encoded image to an image display terminal in a form of a communication packet including time information, order information of the communication packet, image data information that represents whether or not data of the communication packet is the image, and storage information that represents whether the image is stored in a single packet, an aggregated packet, or a divided packet by using a first communicator, the image being any one of a reference image and a non- reference image, the reference image being an image that refers to another image that temporally precedes the reference image, the non-reference image being an image that does not refer to the another image;
a second step of causing the image display terminal to receive the image transmitted from the image transmission terminal by using a second communicator;
a third step of causing the image display terminal to determine whether the image received by the second communicator is a normal image or a lost image on the basis the time information, the order information, the image data information, and the storage information, the normal image being an image transmitted from the image transmission terminal and received by the second communicator without being lost, at least part of the lost image being lost;
a fourth step of causing the image display terminal to determine whether the image received by the second communicator is the reference image or the non-reference image;
a fifth step of causing the image display terminal to decode a first image and display the decoded first image on a monitor;
a sixth step of causing the image display terminal to decode a second image and display the decoded second image on the monitor, the first image and the second image being an image that has been determined as the normal image and the non-reference image, a scheduled order in which the first image is displayed on the monitor being before a scheduled order in which the second image is displayed on the monitor;
a seventh step of causing the image display terminal to decode all of one or more third images and display all the decoded third images on the monitor in a scheduled order when it is determined that all the third images are the normal image, the one or more third images being scheduled to be displayed on the monitor after the first image is displayed and before the second image is displayed; and
an eighth step of causing the image display terminal to replace all the third images with the first image, decode the first image, and display the decoded first image on the monitor instead of each of the third images at a timing at which each of the third images is scheduled to be displayed when it is determined that at least one of the third images is the lost image.

7. A non-transitory computer-readable recording medium saving a program for causing a computer to execute:
a first step of causing a communicator to receive an image transmitted from an image transmission terminal in a form of a communication packet including time information, order information of the communication packet, image data information that represents whether or not data of the communication packet is the image, and storage information that represents whether the image is stored in a single packet, an aggregated packet, or a divided packet, the image being any one of a reference image and a non-reference image, the reference image being an image that refers to another image that temporally precedes the reference image, the non-reference image being an image that does not refer to the another image;

a second step of determining whether the image transmitted from the image transmission terminal is a normal image or a lost image on the basis of the time information, the order information, the image data information, and the storage information, the normal image being an image transmitted from the image transmission terminal and received by the communicator without being lost, at least part of the lost image being lost;

a third step of determining whether the image received by the communicator is the reference image or the non-reference image;

a fourth step of decoding a first image and causing a monitor to display the decoded first image;

a fifth step of decoding a second image and causing the monitor to display the decoded second image, the first image and the second image being an image that has been determined as the normal image and the non-reference image, a scheduled order in which the first image is displayed on the monitor being before a scheduled order in which the second image is displayed on the monitor;

a sixth step of decoding all of one or more third images and causing the monitor to display all the decoded third images in a scheduled order when it is determined that all the third images are the normal image, the one or more third images being scheduled to be displayed on the monitor after the first image is displayed and before the second image is displayed; and a seventh step of replacing all the third images with the first image, decoding the first image, and causing the monitor to display the decoded first image instead of each of the third images at a timing at which each of the third images is scheduled to be displayed when it is determined that at least one of the third images is the lost image.

* * * * *